(12) United States Patent
Mimura et al.

(10) Patent No.: US 12,090,913 B2
(45) Date of Patent: Sep. 17, 2024

(54) INFORMATION PRESENTATION DEVICE FOR AUTONOMOUS VEHICLE

(71) Applicant: HONDA MOTOR CO., LTD., Tokyo (JP)

(72) Inventors: Yoshitaka Mimura, Saitama (JP); Yuji Tsuchiya, Saitama (JP); Takashi Oshima, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 511 days.

(21) Appl. No.: 17/412,868

(22) Filed: Aug. 26, 2021

(65) Prior Publication Data

US 2022/0066444 A1  Mar. 3, 2022

(30) Foreign Application Priority Data

Aug. 27, 2020  (JP) .................................. 2020-143965

(51) Int. Cl.
*B60Q 1/00* (2006.01)
*B60Q 1/50* (2006.01)
(Continued)

(52) U.S. Cl.
CPC ......... *B60Q 1/0052* (2013.01); *B60Q 1/5037* (2022.05); *B60Q 1/507* (2022.05);
(Continued)

(58) Field of Classification Search
CPC .... B60W 30/06; B60W 50/14; B60W 60/001; B60W 2050/146; B60W 2540/043; G05D 1/0016; G06V 20/597; G06V 20/56
See application file for complete search history.

(56) References Cited

U.S. PATENT DOCUMENTS

2017/0329346 A1* 11/2017 Latotzki ............... G05D 1/0291
2018/0141489 A1* 5/2018 Zhang .................... B60Q 1/545
(Continued)

FOREIGN PATENT DOCUMENTS

CN  108698611 A  10/2018
CN  109278680 A  1/2019
(Continued)

OTHER PUBLICATIONS

Sep. 27, 2023, Translation of Chinese Office Action issued for related CN Application No. 202110991926.1.

*Primary Examiner* — Ian Jen
*Assistant Examiner* — Renee LaRose
(74) *Attorney, Agent, or Firm* — Paratus Law Group, PLLC

(57) ABSTRACT

An information presentation device for an autonomous vehicle that automatically moves to a predetermined position where a user can get into an own vehicle in response to a request from the user includes an identification unit and an information presentation unit. The identification unit searches for a person present around the own vehicle based on external environment information including a target present around the own vehicle, and identifies whether a person extracted by the search coincides with the user of the own vehicle. When the identification indicating, as an identification result of the identification unit, that the person extracted by the search coincides with the user of the own vehicle is performed, the information presentation unit performs presentation of information to be presented to the user, and changes a presentation mode of information to be presented to the user according to a distance from the own vehicle to the user.

6 Claims, 13 Drawing Sheets

(51) Int. Cl.
    *B60W 30/06*      (2006.01)
    *B60W 50/14*      (2020.01)
    *B60W 60/00*      (2020.01)
    *G05D 1/00*       (2024.01)
    *G06V 20/59*      (2022.01)

(52) U.S. Cl.
    CPC ............ *B60Q 1/547* (2022.05); *B60Q 1/549* (2022.05); *B60W 30/06* (2013.01); *B60W 50/14* (2013.01); *B60W 60/001* (2020.02); *G05D 1/0016* (2013.01); *G06V 20/597* (2022.01); *B60Q 2900/40* (2022.05); *B60W 2050/146* (2013.01); *B60W 2420/403* (2013.01); *B60W 2420/408* (2024.01); *B60W 2540/043* (2020.02)

(56) References Cited

U.S. PATENT DOCUMENTS

2018/0300660 A1* 10/2018 Coan .................... H04W 4/029
2021/0197845 A1    7/2021 Mimura

FOREIGN PATENT DOCUMENTS

| CN | 110126817 A | 8/2019 |
| CN | 110962843 A | 4/2020 |
| CN | 111223291 A | 6/2020 |
| JP | 2008-017227 A | 1/2008 |
| JP | 2017-199317 A | 11/2017 |

\* cited by examiner

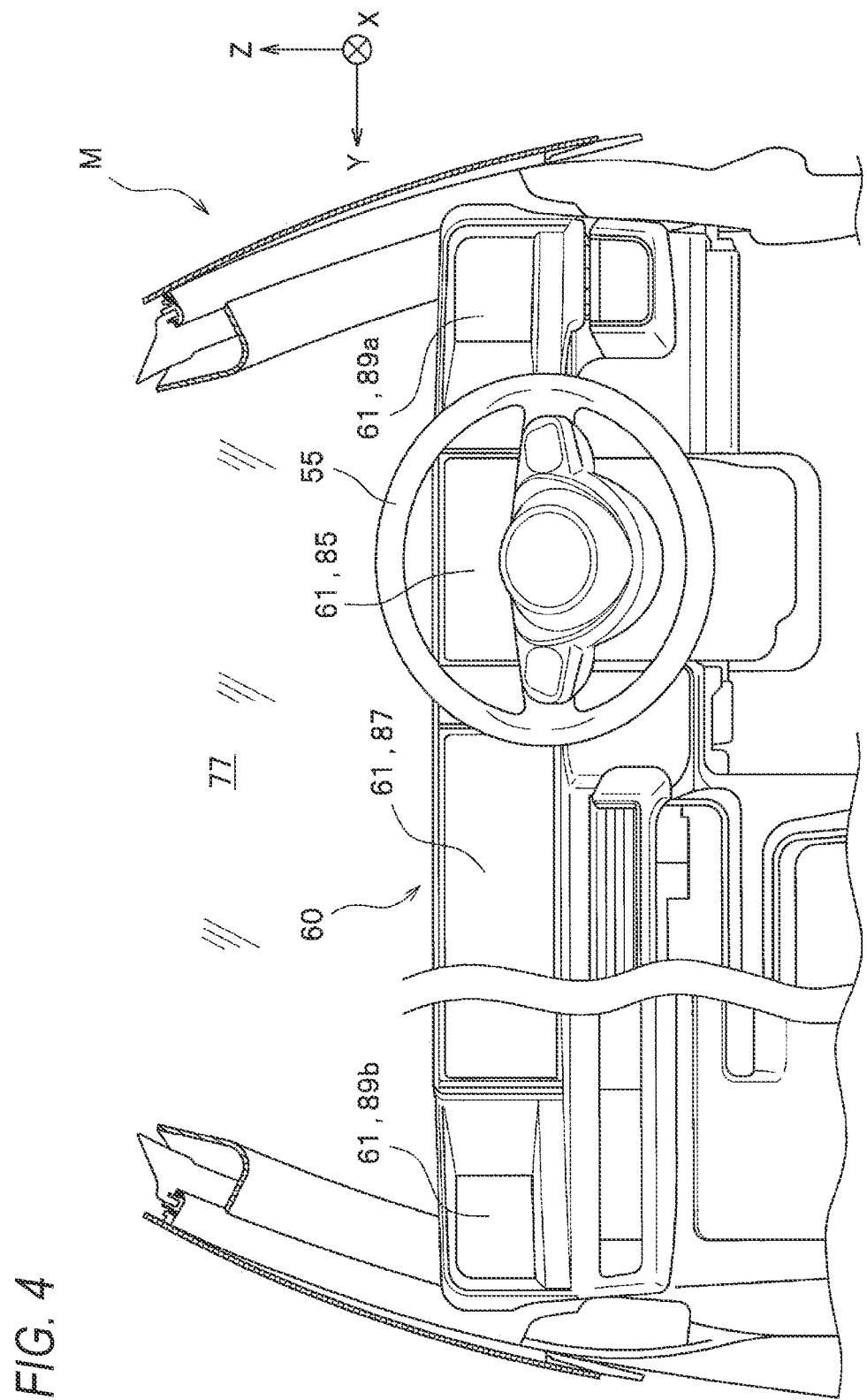

USER DEDICATED PRESENTATION MODE OF "WINK"

USER DEDICATED PRESENTATION MODE OF "SMILE"

USER DEDICATED PRESENTATION MODE OF "GREETINGS"

INFORMATION PRESENTATION DEVICE FOR AUTONOMOUS VEHICLE

CROSS-REFERENCE TO RELATED APPLICATIONS

The present application claims the benefit of priority of Japanese Patent Application No. 2020-143965, filed on Aug. 27, 2020, the content of which is incorporated herein by reference.

TECHNICAL FIELD

The present invention relates to an information presentation device for an autonomous vehicle that is used in an autonomous vehicle and presents information to a person present around the own vehicle.

BACKGROUND ART

In recent years, in order to realize safe and comfortable operation of a vehicle while reducing a burden on a driver, a technology called autonomous driving has been eagerly proposed.

As an example of the autonomous driving technology, JP-A-2017-199317 discloses a vehicle control system including: a detection unit that detects a surrounding state of a vehicle; an autonomous driving control unit that execute autonomous driving in which at least one of speed control and steering control of the vehicle is automatically performed based on the surrounding state of the vehicle detected by the detection unit; a recognition unit that recognizes a direction of a person with respect to the vehicle based on the surrounding state of the vehicle detected by the detection unit; and an output unit that outputs information recognizable by the person recognized by the recognition unit and having directivity in the direction of the person recognized by the recognition unit.

Further, JP-A-2008-017227 discloses a face recognition device including: an imaging device that is attached to an automobile and images a face of a person present in a field of view of imaging; and a face registration unit that stores face feature information of a person registered as a user in association with user identification information. The face recognition device performs recognition processing based on face feature information of an imaged face image and the face feature information registered in the face registration unit and outputs a recognition result thereof. When recognition fails, the face recognition device turns on an illumination device that illuminates a face of a person in the field of view of imaging to acquire a face image again, and performs re-recognition processing.

SUMMARY OF INVENTION

However, in the related art, there is room for improvement from the viewpoint of causing a user of an autonomous vehicle to develop a feeling of attachment to the autonomous vehicle.

The present environment provides an information presentation device for an autonomous vehicle capable of causing a user of an autonomous vehicle to develop a feeling of attachment to the autonomous vehicle.

Solution to Problem

The present environment provides an information presentation device for an autonomous vehicle that is used for an autonomous vehicle and presents information to a person present around an own vehicle, in which the autonomous vehicle acquires external environment information including a target present around the own vehicle, generates an action plan of the own vehicle based on the acquired external environment information, and automatically moves according to the generated action plan, and the autonomous vehicle automatically moves, in response to a request from a user of the own vehicle, to a predetermined position where the user is able to get into the own vehicle, the information presentation device for an autonomous vehicle including:

an identification unit that searches for a person present around the own vehicle based on the external environment information at the predetermined position and identifies whether a person extracted by the search coincides with the user; and an information presentation unit that performs presentation of information dedicated to a person present around the own vehicle by using an external display device provided in the own vehicle, in which when identification indicating, as an identification result of the identification unit, that the person extracted by the search coincides with the user is performed, the information presentation unit performs presentation of information to be presented to the user, and changes a presentation mode of information to be presented to the user according to a distance from the own vehicle to the user.

Advantageous Effects

According to the present invention, an information presentation device for an autonomous vehicle capable of causing a user of an autonomous vehicle to develop a feeling of attachment to the autonomous vehicle can be provided.

BRIEF DESCRIPTION OF DRAWINGS

FIG. 4 is a diagram illustrating a front structure in a vehicle interior of an autonomous vehicle.

DESCRIPTION OF EMBODIMENTS

Figure 1:
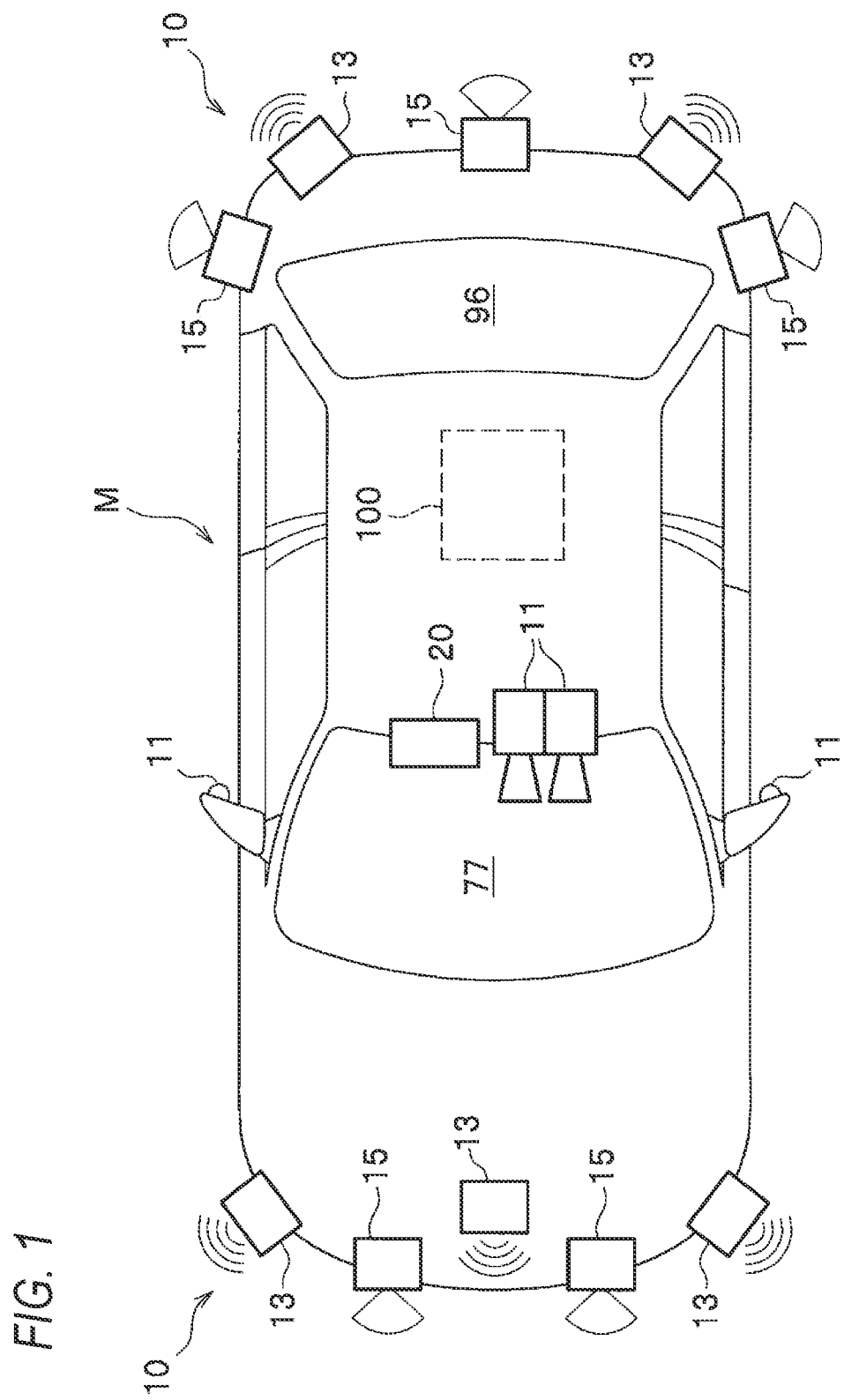
FIG. 1 is an overall configuration diagram of an autonomous vehicle including an information presentation device according to an embodiment of the present invention.

Hereinafter, an information presentation device for an autonomous vehicle according to an embodiment of the present invention will be described in detail with reference to the drawings.

Note that, in the drawings described below, members having common functions are denoted by common reference signs. In addition, the size and shape of the member may be schematically illustrated in a deformed or exaggerated manner for convenience of description.

When expressions of left and right are used for an own vehicle M in describing a vehicle control device according to the embodiment of the present disclosure, orientation of a vehicle body of the own vehicle M is used as a reference. Specifically, for example, in a case where the own vehicle M has a right hand drive specification, a driver seat side is referred to as a right side, and a passenger seat side is referred to as a left side.

<<Configuration of Own Vehicle M>>

First, a configuration of an autonomous vehicle (hereinafter, also referred to as an "own vehicle") M including a vehicle control device 100 according to an embodiment of the present invention will be described with reference to FIG. 1.

FIG. 1 is an overall configuration diagram of the autonomous vehicle M including the vehicle control device 100 according to the embodiment of the present invention.

In FIG. 1, the own vehicle M on which the vehicle control device 100 is mounted is, for example, an automobile such as a two-wheeled automobile, a three-wheeled automobile, or a four-wheeled automobile.

Examples of the own vehicle M include an automobile having an internal combustion engine such as a diesel engine or a gasoline engine as a power source, an electric automobile having an electric motor as a power source, and a hybrid automobile having both an internal combustion engine and an electric motor. Among them, the electric automobile is driven by using electric power discharged from a battery such as a secondary battery, a hydrogen fuel cell, a metal fuel cell, or an alcohol fuel cell.

As illustrated in FIG. 1, the own vehicle M is equipped with: an external environment sensor 10 that has a function of detecting external environment information on a target including an object or a sign present around the own vehicle M; a navigation device 20 that has a function of mapping a current position of the own vehicle M on a map, performing route guidance to a destination, and the like; and the vehicle control device 100 that has a function of performing autonomous travel control of the own vehicle M including steering and acceleration and deceleration of the own vehicle M, and the like.

These devices and instruments are connected to each other via a communication medium such as a controller area network (CAN) so as to be able to perform data communication with each other.

In the present embodiment, a configuration in which the external environment sensor 10 and the like are provided outside the vehicle control device 100 will be described as an example, and alternatively the vehicle control device 100 may be configured to include the external environment sensor 10 and the like.

[External Environment Sensor 10]

The external environment sensor 10 includes a camera 11, a radar 13, and a LIDAR 15.

The camera 11 has an optical axis inclined obliquely downward at a front portion of the own vehicle and has a function of imaging an image in a traveling direction of the own vehicle M. As the camera 11, for example, a complementary metal oxide semiconductor (CMOS) camera, a charge-coupled device (CCD) camera, or the like can be appropriately used. The camera 11 is, for example, provided in the vicinity of a rearview mirror (not illustrated) in a vehicle interior of the own vehicle M, and in a front portion of a right door and a front portion of a left door outside the vehicle interior of the own vehicle M.

For example, the camera 11 periodically and repeatedly images a state of a front side, a right rear side, and a left rear side in the traveling direction of the own vehicle M. In the present embodiment, the camera 11 provided in the vicinity of the rearview mirror is configured with a pair of monocular cameras arranged side by side. The camera 11 may be a stereo camera.

Image information on the front side, the right rear side, and the left rear side in the traveling direction of the own vehicle M acquired by the camera 11 is transmitted to the vehicle control device 100 via a communication medium.

The radar 13 has a function of emitting a radar wave to a target including a preceding vehicle, which travels in front of the own vehicle M and is a follow-up target thereof, and receiving the radar wave reflected by the target, thereby acquiring distribution information of the target including a distance to the target and an azimuth of the target. As the radar wave, a laser, a microwave, a millimeter wave, an ultrasonic wave, or the like can be appropriately used.

In the present embodiment, as illustrated in FIG. 1, five radars 13 are provided, specifically, three on a front side and two on a rear side. The distribution information of the target acquired by the radar 13 is transmitted to the vehicle control device 100 via a communication medium.

The LIDAR. (Light Detection and Ranging) 15 has, for example, a function of detecting presence or absence of a target and a distance to the target by measuring time required for detection of scattered light with respect to irradiation light. In the present embodiment, as illustrated in FIG. 1, five LIDARs 15 are provided, specifically, two on the front side and three on the rear side. The distribution information of the target acquired by the LIDAR 15 is transmitted to the vehicle control device 100 via a communication medium.

[Navigation Device 20]

Figure 3:
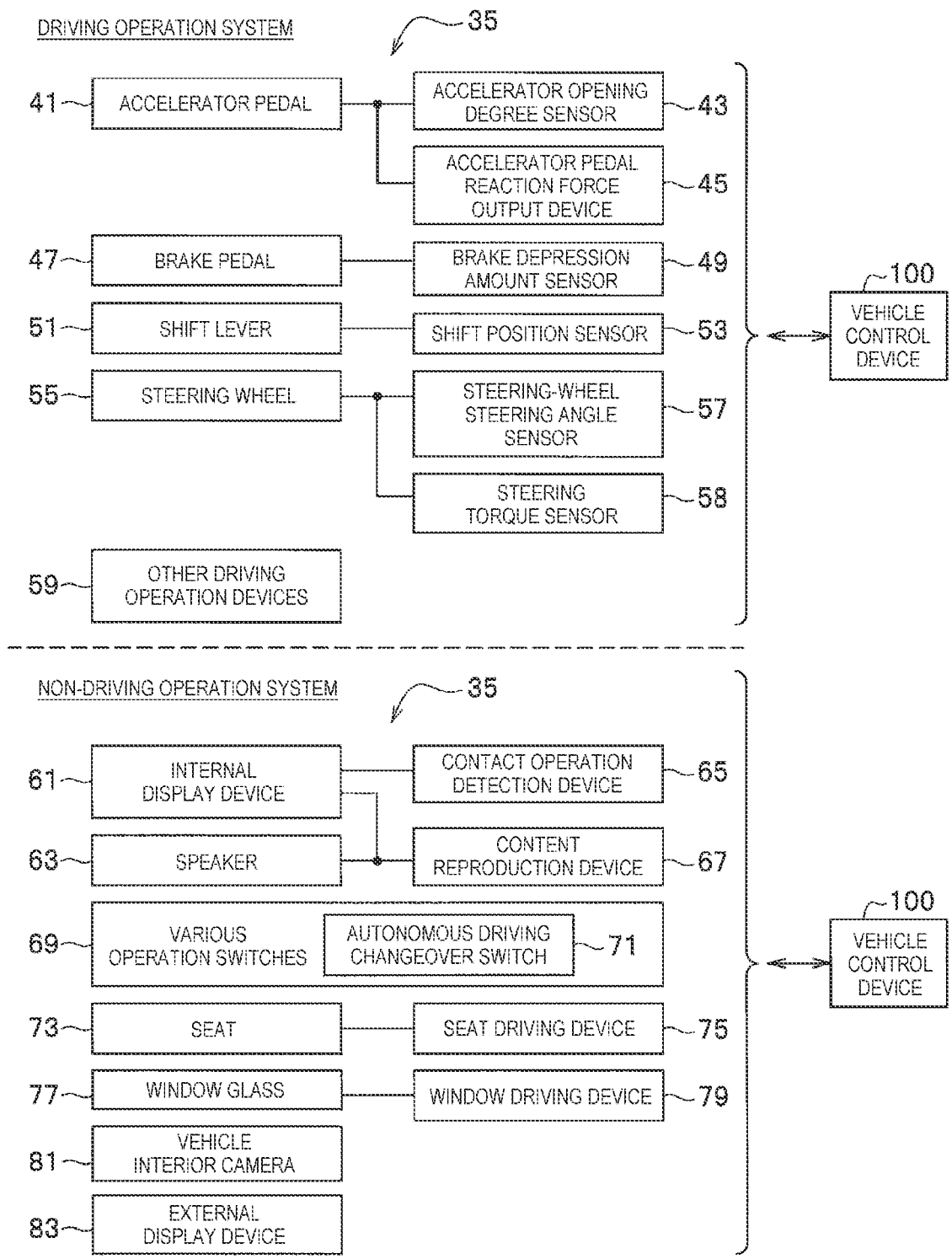
FIG. 3 is a schematic configuration diagram of an HMI provided in the information presentation device for an autonomous vehicle.

The navigation device 20 includes a global navigation satellite system (GNSS) receiver, map information (navigation map), a touch panel type internal display device 61 functioning as a human machine interface, a speaker 63 see FIG. 3), a microphone, and the like. The navigation device 20 serves to calculate a current position of the own vehicle M by the GNSS receiver and to derive a route from the current position to a destination designated by a user.

The route derived by the navigation device 20 is provided to a target lane determination unit 110 (described later) of the vehicle control device 100. The current position of the own vehicle M may be specified or complemented by an inertial navigation system (INS) using an output of a vehicle sensor 30 (see FIG. 2). When the vehicle control device 100 is executing a manual driving mode, the navigation device 20 provides guidance on a route to a destination by voice or map display.

The function for determining a current position of the own vehicle M may be provided independently of the navigation device 20. The navigation device 20 may be implemented by, for example, a function of a terminal device (hereinafter, also referred to as a "terminal device") such as a smartphone or a tablet terminal carried by a user. In this case, transmission and reception of information is performed between the terminal device and the vehicle control device 100 by wireless or wired communication.

<<Configuration of Vehicle Control Device 100 and Configuration of Peripheral Portion Thereof=>

Next, a configuration of the vehicle control device 100 mounted on the own vehicle M and a configuration of a peripheral portion thereof will be described with reference to FIG. 2.

Figure 2:
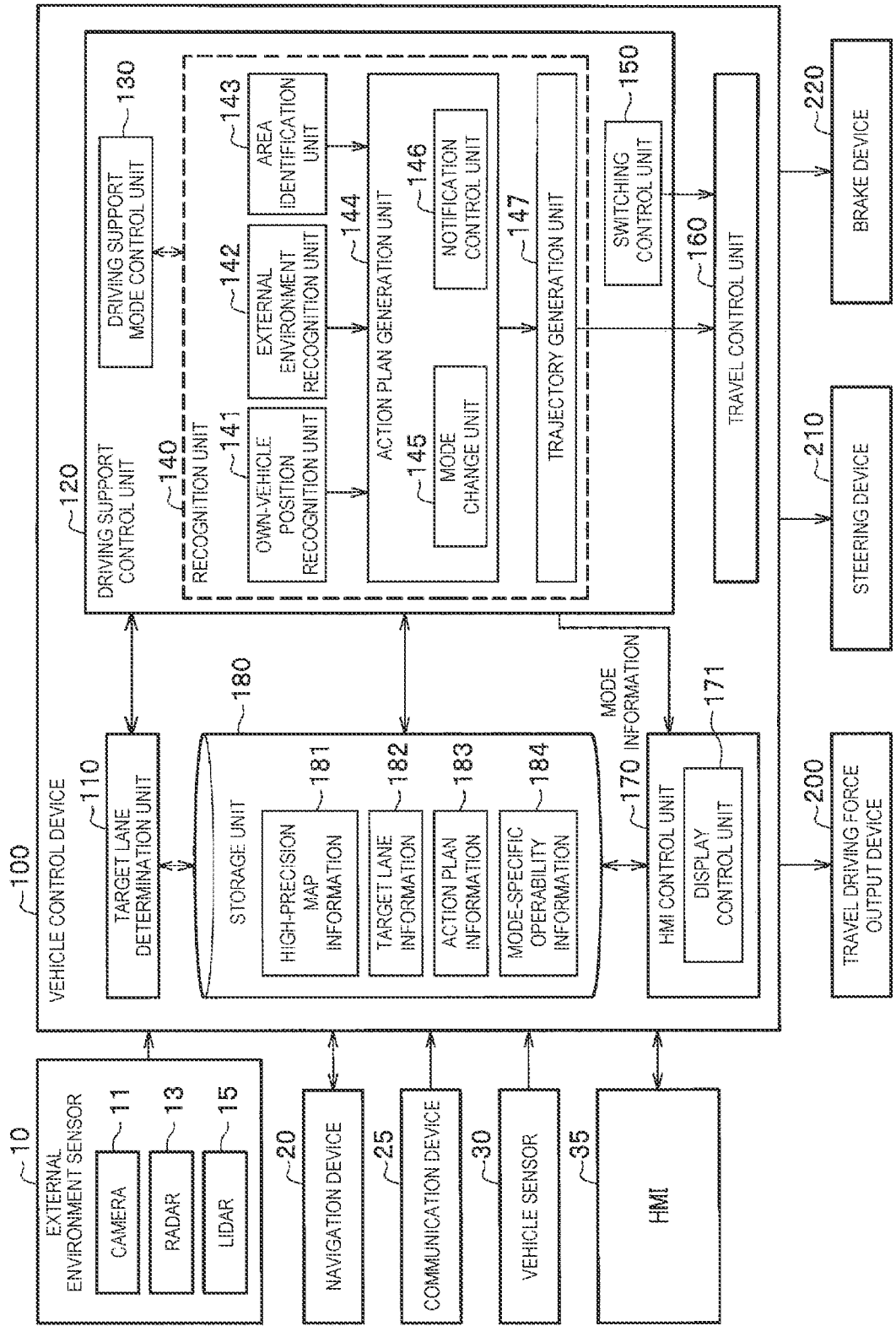
FIG. 2 is a functional block configuration diagram illustrating a configuration of a vehicle control device including an information presentation device for an autonomous vehicle according to the embodiment of the invention and a configuration of a peripheral portion thereof.

FIG. 2 is a functional block configuration diagram illustrating the configuration of the vehicle control device 100 according to the embodiment of the present invention and the configuration of the peripheral portion thereof.

As illustrated in FIG. 2, in addition to the external environment sensor 10, the navigation device 20, and the vehicle control device 100 described above, a communication device 25, the vehicle sensor 30, a human machine interface (HMI) 35, a travel driving force output device 200, a steering device 210, and a brake device 220 are mounted on the own vehicle M.

The communication device 25, the vehicle sensor 30, the HMI 35, the travel driving force output device 200, the steering device 210, and the brake device 220 are connected to the vehicle control device 100 via a communication medium so as to be able to perform data communication with the vehicle control device 100.

[Communication Device 25]

The communication device 25 has a function of performing communication via a wireless communication medium such as a cellular network, a Wi-Fi network, Bluetooth (registered trademark), or dedicated short range communication (DSRC).

The communication device 25 performs wireless communication with an information providing server of a system that monitors a traffic condition of a road such as the Vehicle Information and Communication System (VICS) (registered trademark), and acquires traffic information indicating a traffic condition of a road on which the own vehicle M is traveling or is scheduled to travel. The traffic information includes information on traffic congestion in front of the own vehicle M, information on required time for passing through a traffic congestion point, accident/failed vehicle/construction information, speed regulation/lane regulation information, parking lot position information, information on whether a parking lot/service area/parking area is full or has vacancy, and the like.

The communication device 25 may acquire the traffic information by performing communication with a wireless beacon provided at a side band of a road or the like or performing inter-vehicle communication with another vehicle traveling around the own vehicle M.

For example, the communication device 25 performs wireless communication with an information providing server of traffic signal prediction systems (TSPS), and acquires signal information related to a traffic signal provided on a road on which the own vehicle M is traveling or is scheduled to travel. The TSPS serves to support driving for smoothly passing through a crossroad with a traffic light by using signal information of the traffic light.

The communication device 25 may acquire the signal information by performing communication with an optical beacon provided on a side band of a road or the like or performing inter-vehicle communication with another vehicle traveling around the own vehicle M.

Furthermore, the communication device 25 performs wireless communication with a terminal device such as a smartphone or a tablet terminal carried by a user, for example, and acquires user position information indicating a current position of the user. For example, the terminal device calculates a current position of the terminal device by a GNSS receiver included in the terminal device, and transmits information indicating the calculated current position of the terminal device to the communication device 25 as user position information. Accordingly, the communication device 25 can acquire the user position information from the terminal device. The terminal device is not limited to a smartphone or a tablet terminal, and may be, for example, a so-called smart key.

As will be described in detail later, the autonomous vehicle M is a vehicle that can automatically enter and exit a parking lot of a so-called automated valet parking system. For example, when the own vehicle M enters and exits a parking lot of an automated valet parking system, the communication device 25 performs wireless communication with a parking lot management server that manages the parking lot, and acquires information (for example, an entry instruction and an exit instruction to be described later) for the own vehicle M to automatically enter and exit the parking lot. In the present embodiment, an example in which an entry instruction and an exit instruction are acquired from the parking lot management server will be described, but the present invention is not limited thereto. For example, the communication device 25 may acquire the entry instruction or the exit instruction from the terminal device of the user.

[Vehicle Sensor 30]

The vehicle sensor 30 has a function of detecting various types of information relating to the own vehicle M. The vehicle sensor 30 includes a vehicle speed sensor that detects a vehicle speed of the own vehicle M, an acceleration sensor that detects an acceleration of the own vehicle M, a yaw-rate sensor that detects an angular velocity around a vertical axis of the own vehicle M, an orientation sensor that detects orientation of the own vehicle M, an inclination angle sensor that detects an inclination angle of the own vehicle M, an illuminance sensor that detects illuminance of a place where the own vehicle M is present, a raindrop sensor that detects an amount of raindrops of a place where the own vehicle M is present, and the like.

[Configuration of HMI 35]

Figure 5A:
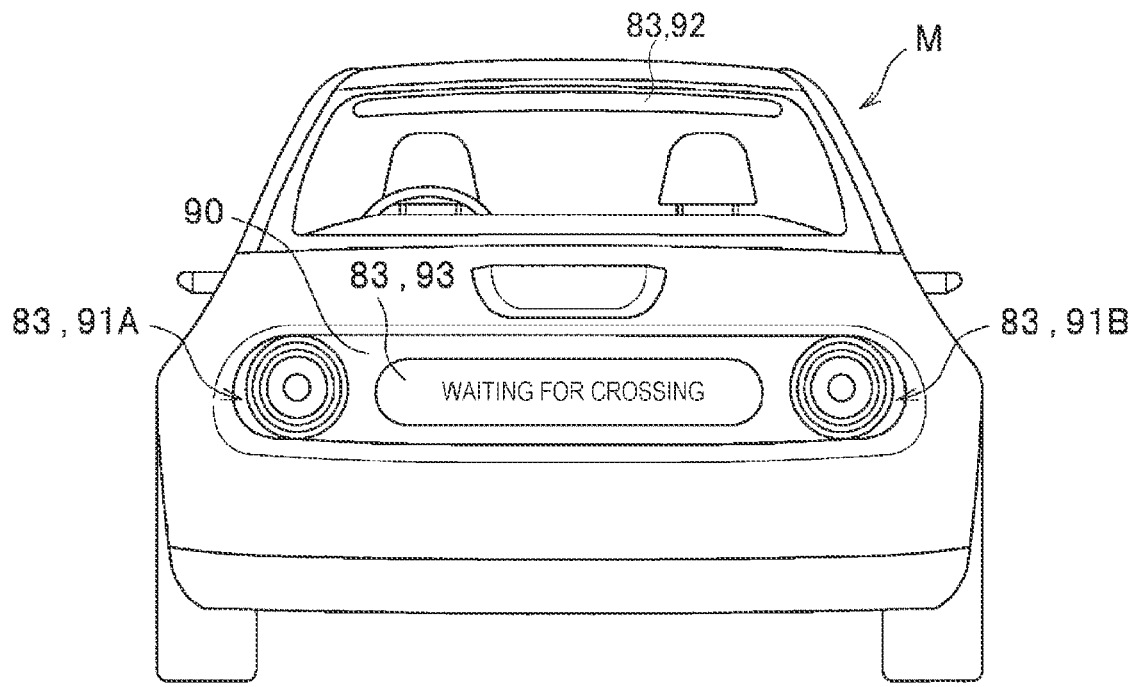
FIG. 5A is an external view illustrating a front structure of the autonomous vehicle.
Figure 5B:
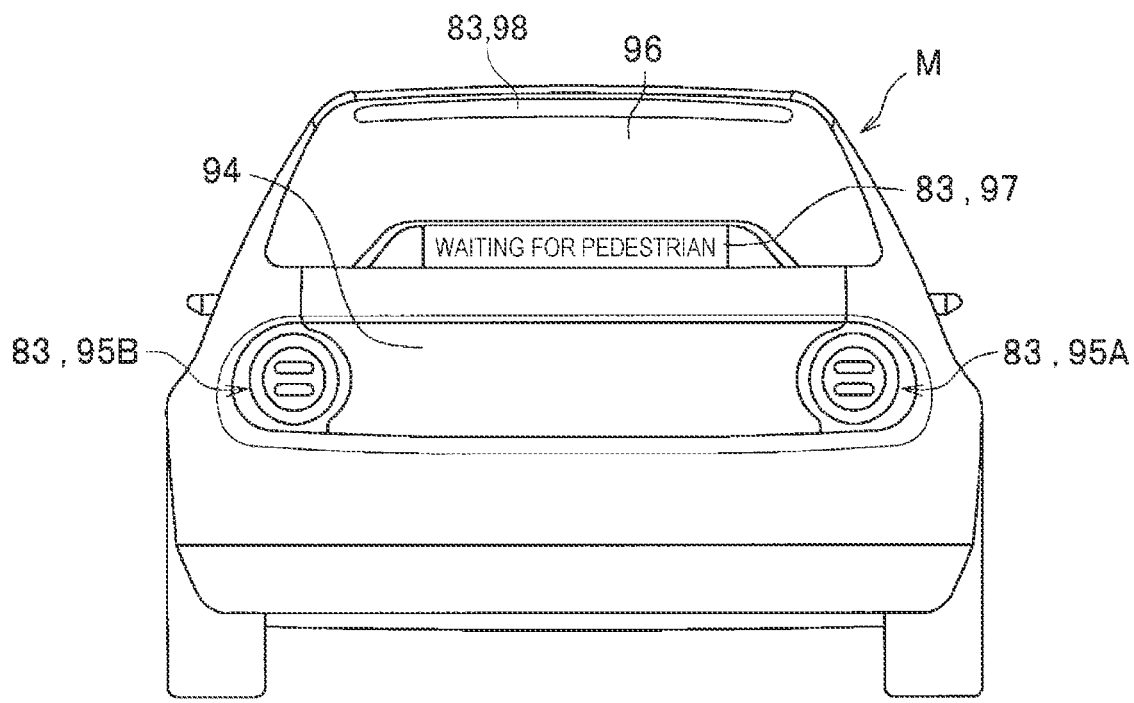
FIG. 5B is an external view illustrating a rear structure of the autonomous vehicle.

Next, the HMI 35 will be described with reference to FIGS. 3, 4, 5A, and 5B,

FIG. 3 is a schematic configuration diagram of the HMI 35 connected to the vehicle control device 100 according to the embodiment of the present invention. FIG. 4 is a diagram illustrating a front structure in the vehicle interior of the vehicle M including the vehicle control device 100. FIGS. 5A and 5B are external views illustrating a front structure and a rear structure of the vehicle M including the vehicle control device 100, respectively.

As illustrated in FIG. 3, the HMI 35 includes components of a driving operation system and components of a non-driving operation system. A boundary between a component of a driving operation system and a component of a non-driving operation system is not clear, and a component of a the driving operation system may be configured to have a function of a non-driving operation system (or vice versa).

The HMI 35 includes, as components of a driving operation system, an accelerator pedal 41, an accelerator opening degree sensor 43, an accelerator pedal reaction force output device 45, a brake pedal 47, a brake depression amount sensor 49, a shift lever 51, a shift position sensor 53, a steering wheel 55, a steering-wheel steering angle sensor 57, a steering torque sensor 58, and other driving operation devices 59.

The accelerator pedal 41 is an acceleration operator for receiving an acceleration instruction (or a deceleration instruction by a return operation) from a driver. The accelerator opening degree sensor 43 detects an amount of depression of the accelerator pedal 41, and outputs an accelerator opening degree signal indicating the amount of depression to the vehicle control device 100.

Instead of outputting an accelerator opening degree signal to the vehicle control device 100, a configuration may be adopted in which the accelerator opening degree signal is directly output to the travel driving force output device 200, the steering device 210, or the brake device 220. The same applies to other configurations of the driving operation system described below. The accelerator pedal reaction force output device 45 outputs a force (operation reaction force) directed opposite to an operation direction to the accelerator pedal 41, for example, in response to an instruction from the vehicle control device 100.

The brake pedal 47 is a deceleration operator for receiving a deceleration instruction from the driver. The brake depression amount sensor 49 detects a depression amount (or a depression force) of the brake pedal 47, and outputs a brake signal indicating a detection result thereof to the vehicle control device 100.

The shift lever 51 is a speed changing operator for receiving a shift stage change instruction from the driver. The shift position sensor 53 detects a shift stage instructed by the driver, and outputs a shift position signal indicating a detection result thereof to the vehicle control device 100.

The steering wheel 55 is a steering operator for receiving a turning instruction from the driver. The steering-wheel steering angle sensor 57 detects an operation angle of the steering wheel 55, and outputs a steering-wheel steering angle signal indicating a detection result thereof to the vehicle control device 100. The steering torque sensor 58 detects a torque applied to the steering wheel 55, and outputs a steering torque signal indicating a detection result thereof to the vehicle control device 100.

The other driving operation devices 59 are, for example, a joystick, a button, a dial switch, a graphical user interface (GUI) switch, and the like. The other driving operation devices 59 receive an acceleration instruction, a deceleration instruction, a turning instruction, and the like, and output the instructions to the vehicle control device 100.

Further, the HMI 35 includes, for example, the internal display device 61, the speaker 63, a touch operation detection device 65, a content reproduction device 67, various operation switches 69, a seat 73 and a seat driving device 75, a window glass 77 and a window driving device 79, a vehicle interior camera 81, an external display device 83, and the like as components of a non-driving, operation system.

The internal display device 61 is preferably a touch panel type display device having a function of displaying various types of information to an occupant in the vehicle interior. As illustrated in FIG. 4, the internal display device 61 includes, in an instrument panel 60, a meter panel 85 that is provided at a position directly facing a driver's seat, a multi-information panel 87 that is provided so as to face the drives seat and a passenger's seat and is horizontally long in a vehicle width direction (a Y-axis direction in FIG. 4), a right panel 89a that is provided on a driver's seat side in the vehicle width direction, and a left panel 89b that is provided on a passenger's seat side in the vehicle width direction. The internal display device 61 may be additionally provided at a position facing a rear seat (on the back side of all seats).

The meter panel 85 displays, for example, a speedometer, a tachometer, an odometer, shift position information, lighting status information of lights, and the like.

The multi-information panel 87 displays, for example, various types of information such as map information on surroundings of the own vehicle M, current position information of the own vehicle M on a map, traffic information (including signal information) on a current traveling path/a scheduled route of the own vehicle M, traffic participant information on traffic participants (including pedestrians, bicycles, motorcycles, other vehicles, and the like) present around the own vehicle M, and messages issued to the traffic participants.

On the right panel 89a, image information on a rear side and a lower side on the right side of the own vehicle M imaged by the camera 11 provided on the right side of the own vehicle M is displayed.

On the left panel 89b, image information on a rear side and a lower side on the left side of the own vehicle M imaged by the camera 11 provided on the left side of the own vehicle M is displayed.

The internal display device 61 is not particularly limited, and may be configured with, for example, an LCD (Liquid Crystal Display), an organic EL (Electroluminescence) display, or the like. The internal display device 61 may be configured with a head-up display (HUD) that projects a required image on the window glass 77.

The speaker 63 has a function of outputting a sound. An appropriate number of speakers 63 are provided at appropriate positions such as the instrument panel 60, a door panel, and a rear parcel shelf (all of which are not illustrated) in the vehicle interior, for example.

When the internal display device 61 is a touch panel type, the touch operation detection device 65 functions to detect a touch position on a display screen of the internal display device 61, and output information on the detected touch position to the vehicle control device 100. When the internal display device 61 is not a touch panel type, the touch operation detection device 65 may be not provided.

The content reproduction device 67 includes, for example, a digital versatile disc (DVD) reproduction device, a compact disc (CD) reproduction device, a television receiver, a device for generating various guide images, or the like. A part or all of the internal display device 61, the speaker 63, the touch operation detection device 65, and the content reproduction device 67 may be configured to be common to the navigation device 20.

The various operation switches 69 are provided at appropriate positions in the vehicle interior. The various operation switches 69 include an autonomous driving changeover switch 71 that instructs immediate start (or future start) and stop of autonomous driving. The autonomous driving changeover switch 71 may be either a graphical user interface (GUI) switch or a mechanical switch. The various operation switches 69 may include switches for driving the seat driving device 75 and the window driving device 79.

The seat 73 is a seat on which an occupant of the ow vehicle M sits. The seat driving device 75 freely drives the seat 73 to change a reclining angle, a position in a front-rear direction, a yaw angle, and the like thereof. The window glass 77 is provided, for example, in each door. The window driving device 79 drives the window glass 77 to open and close.

The vehicle interior camera 81 is a digital camera using a solid-state imaging element such as a CCD or a CMOS. The vehicle interior camera 81 is provided at a position where it is possible to image at least the head of a driver seated in the driver's seat, such as a rearview mirror, a steering boss portion (both are not illustrated), and the instrument panel 60. For example, the vehicle interior camera 81 periodically and repeatedly images a state of the vehicle interior including the driver.

The external display device 83 has a function of displaying (notifying) various types of information to traffic participants (including pedestrians, bicycles, motorcycles, other vehicles, and the like) present around the own vehicle M. As illustrated in FIG. 5A, the external display device 83 provided in a front portion of the own vehicle M includes, in a front grille 90 of the own vehicle M, a right front light portion 91A and a left front light portion 91B that are provided apart from each other in the vehicle width direction, and a front display portion 93 provided between the left and right front light portions 91A and 91B.

The external display device 83 provided in the front portion of the own vehicle M further includes a front indicator 92. When the own vehicle M is moving by autonomous travel control of the vehicle control device 100, that is, when the own vehicle M is moving by autonomous driving, the front indicator 92 is turned on facing the front side of the own vehicle M, and notifies a traffic participant present in front of the own vehicle M that the own vehicle M is moving by autonomous driving.

As illustrated in FIG. 5B, the external display device 83 provided in a rear portion of the own vehicle M includes, in a rear grille 94 of the own vehicle M, a right rear light portion 95A and a left rear light portion 95B that are provided apart from each other in the vehicle width direction, and a rear display portion 97 that is provided in the vehicle interior of the own vehicle M at a position that can be faced from the outside through a central lower portion of a rear window 96. The rear display portion 97 is provided, for example, at an opening lower end portion (not illustrated) of the rear window 96.

The external display device 83 provided in the rear portion of the own vehicle M further includes a rear indicator 98. When the own vehicle M is moving by autonomous travel control of the vehicle control device 100, that is, when the own vehicle M is moving by autonomous driving, the rear indicator 98 is turned on facing the rear side of the own vehicle M, and notifies a traffic participant present behind the own vehicle M that the own vehicle M is moving by autonomous driving.

Note that a right indicator may be provided so that, when the own vehicle M is moving by autonomous driving, the right indicator is turned on facing a right side of the own vehicle M and notifies a traffic participant present on the right side of the own vehicle M that the own vehicle M is moving by autonomous driving. But a detailed description and illustration thereof is omitted. Similarly, a left indicator may be provided so that, when the own vehicle M is moving by autonomous driving, the left indicator is turned on facing a left side of the own vehicle M and notifies a traffic participant present on the left side of the own vehicle M that the own vehicle M is moving by autonomous driving.

Figure 5C:
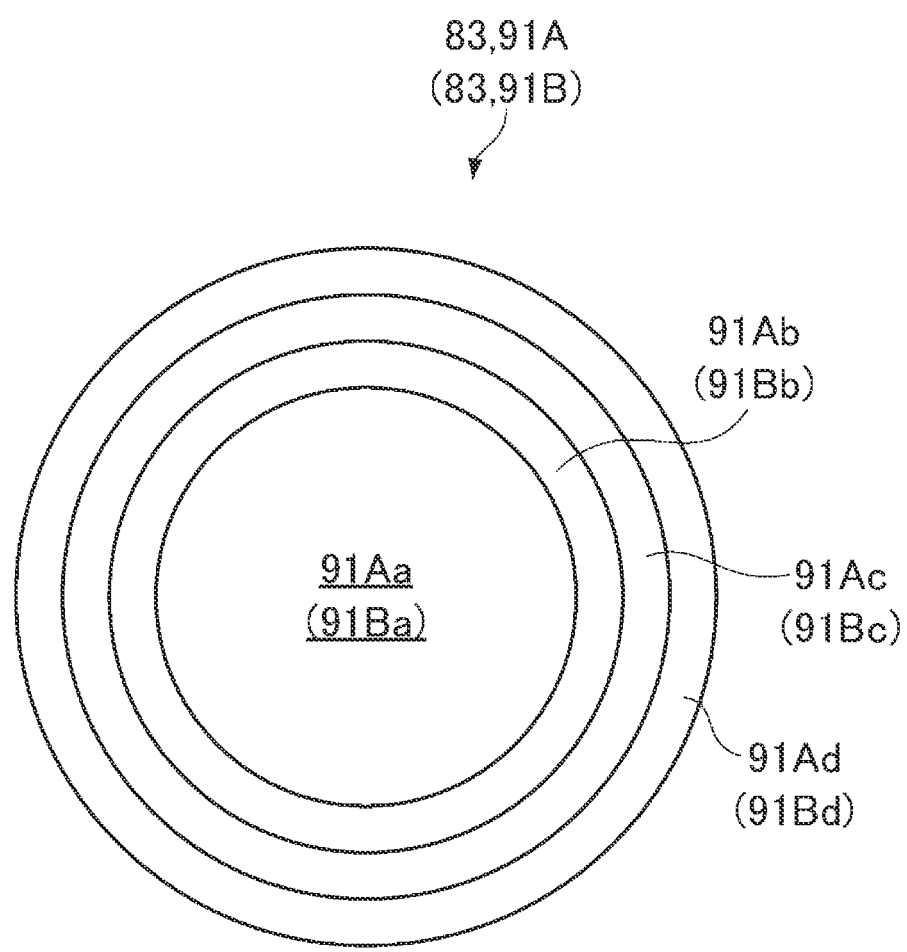
FIG. 5C is a front view illustrating a schematic configuration of left and right front light portions provided in the autonomous vehicle.

Here, a configuration of the left and right front light portions 91A and 91B of the external display device 83 will be described with reference to FIG. 5C. FIG. 5C is a front view illustrating a schematic configuration of the left and right front light portions 91A and 91B provided in the own vehicle M. Since the left and right front light portions 91A and 91B have the same configuration, only one front light portion is illustrated in FIG. 5C. In the following description of FIG. 5C, reference signs without parentheses in FIG. 5C are referred to in describing the right front light portion 91A, and reference signs in parentheses in FIG. 5C are referred to in describing the left front light portion 91B.

The right front light portion 91A is formed in a circular shape as viewed from the front. The right front light portion 91A is configured such that a direction indicator 91Ab, a, light display portion 91Ac, and a position lamp 91Ad, each of which is formed in an annular shape, are sequentially arranged concentrically outward in a radial direction around a headlamp 91Aa, which is formed in a circular shape as viewed from the front and has a smaller diameter dimension than an outer diameter dimension of the right front light portion 91A.

The headlamp 91Aa serves to assist a front field of view of the occupant by emitting light forward in the traveling direction of the own vehicle M while the own vehicle M is traveling in a dark place. When the own vehicle M turns right or left, the direction indicator 91Ab serves to notify traffic participants present around the own vehicle M of the intention of turning right or left. For example, the light display portion 91Ac is provided for communication with the user (including an owner) of the own vehicle M in combination with display content of the front display portion 93. The position lamp 91Ad serves to transmit notify the traffic participants present around the own vehicle M of a vehicle width of the own vehicle M while the own vehicle M is traveling in a dark place.

Similarly to the right front light portion 91A, the left front light portion 91B is also configured such that a direction indicator 91Bb, a light display portion 91Bc, and a position lamp 91Bd, each of which is formed in an annular shape, are sequentially arranged concentrically outward in the radial direction around a headlamp 91Ba formed in a circular shape as viewed from the front. The left and right front light portions 91A and 91B (for example, the left and right light display portions 91Ac and 91Bc) are used for information presentation by an information presentation unit 331 to be described later.

<<Configuration of Vehicle Control Device 100>>

Next, returning to FIG. 2, the configuration of the vehicle control device 100 will be described.

The vehicle control device 100 is implemented with, for example, one or more processors or hardware having equivalent functions. The vehicle control device 100 may have a configuration in which a processor such as a central processing unit (CPU), a storage device, an electronic control unit (ECU) in which a communication interface is connected by an internal bus, or a micro-processing unit (MPU), and the like are combined.

The vehicle control device 100 includes the target lane determination unit 110, a driving support control unit 120, a travel control unit 160, an HMI control unit 170, and a storage unit 180.

The target lane determination unit 110, functions of components of the driving support control unit 120, and a part or all of functions of the travel control unit 160 are implemented by a processor executing a program (software). A part or all of these functions may be implemented with hardware such as large scale integration (LSI) or an application specific integrated circuit (ASIC), or may be implemented by a combination of software and hardware.

In the following description, it is assumed that, in a case where an "XX unit" is mainly described, the driving support control unit 120 reads each program from a ROM/electrically erasable programmable read-only memory (EEPROM) as necessary, loads the program into a RAM, and executes each function (which will be described later). Each program may be stored in the storage unit 180 in advance, or may be loaded into the vehicle control device 100 via another storage medium or a communication medium as necessary.

[Target Lane Determination Unit 110]

The target lane determination unit 110 is implemented with, for example, a micro-processing unit (MPU). The target lane determination unit 110 divides a route provided from the navigation device 20 into a plurality of blocks (for example, divides the route every 100 m in a vehicle traveling direction), and determines a target lane for each block with reference to high-precision map information 181. For example, the target lane determination unit 110 determines which lane from the left the vehicle is to travels in. For example, in a case where a branching point, a merging point, or the like exists in the route, the target lane determination unit 110 determines a target lane such that the own vehicle M can travel on a reasonable travel route for traveling to a branch destination. The target lane determined by the target lane determination unit 110 is stored in the storage unit 180 as target lane information 182.

[Driving Support Control Unit 120]

The driving support control unit 120 includes a driving support mode control unit 130, a recognition unit 140, and a switching control unit 150.

<Driving Support Mode Control Unit 130>

The driving support mode control unit 130 determines an autonomous driving mode (autonomous driving support state) to be executed by the driving support control unit 120, based on an operation of the driver on the HMI 35, an event determined by an action plan generation unit 144, a traveling mode determined by a trajectory generation unit 147, and the like. The autonomous driving mode is notified to the HMI control unit 170.

In any autonomous driving mode, it is possible to switch (override) the autonomous driving mode to a lower-ranking autonomous driving mode by an operation on a component of the driving operation system in the HMI 35.

The override is started, for example, in a case where an operation on a component of the driving operation system of the HMI 35 by the driver of the own vehicle M continues for more than a predetermined period of time or exceeds a predetermined operation change amount (for example, an accelerator opening degree of the accelerator pedal 41, a brake depression amount of the brake pedal 47, or a steering-wheel steering angle of the steering wheel 55), or in a case where an operation on a component of the driving operation system is performed for more than a predetermined number of times.

<Recognition Unit 140>

The recognition unit 140 includes an own-vehicle position recognition unit 141, an external environment recognition unit 142, an area identification unit 143, the action plan generation unit 144, and the trajectory generation unit 147.

<Own-Vehicle Position Recognition Unit 141>

The own-vehicle position recognition unit 141 recognizes a traveling lane in which the own vehicle M is traveling and a relative position of the own vehicle M with respect to the traveling lane, based on the high-precision map information 181 stored in the storage unit 180 and information input from the camera 11, the radar 13, the LIDAR 15, the navigation device 20, or the vehicle sensor 30.

The own-vehicle position recognition unit 141 recognizes the traveling lane by comparing a pattern (for example, arrangement of solid lines and broken lines) of road partition lines recognized from the high-precision map information 181 with a pattern of road partition lines around the own vehicle M recognized from an image imaged by the camera 11. In this recognition, a current position of the own vehicle M acquired from the navigation device 20 or a processing result by the INS may be taken into consideration.

<External Environment Recognition Unit 142>

As illustrated in FIG. 2, the external environment recognition unit 142 recognizes, for example, an external environment state including a position, a vehicle speed, and acceleration of a surrounding vehicle based on external environment information input from the external environment sensor 10 including the camera 11, the radar 13, and the LIDAR 15. The surrounding vehicle is, for example, a vehicle traveling around the own vehicle M, and is another vehicle traveling in the same direction as the own vehicle M (a preceding vehicle and a following vehicle described later).

The position of the surrounding vehicle may be indicated by a representative point such as a center of gravity or a corner of the other vehicle, or may be indicated by a region represented by a contour of the other vehicle. A state of the surrounding vehicle may include a speed and acceleration of the surrounding vehicle and whether the surrounding vehicle is changing a lane (or whether the surrounding vehicle is attempting to change a lane), which are grasped based on information of the various devices. The external environment recognition unit 142 may be configured to recognize a position of a target including a guardrail, a utility pole, a parked vehicle, a pedestrian, and a traffic sign, in addition to a surrounding vehicle including a preceding vehicle and a following vehicle.

In the present embodiment, among surrounding vehicles, a vehicle that travels in a traveling lane common to the own vehicle M and immediately in front of the own vehicle M and is a follow-up target in follow-up travel control is referred to as a "preceding vehicle". In addition, among the surrounding vehicles, a vehicle that travels in a traveling lane common to the own vehicle M and immediately behind the own vehicle M is referred to as a "following vehicle".

<Area Identification Unit 143>

Based on map information, the area identification unit 143 acquires information related to a specific area (interchange (IC)/junction (JCT)/lane increase and decrease point) existing around the own vehicle M. Accordingly, even in a case where a traveling direction image cannot be acquired via the external environment sensor 10 due to blockage of front vehicles including the preceding vehicle, the area identification unit 143 can acquire the information related to the specific area that assists smooth traveling of the ow vehicle M.

Instead of acquiring the information related to the specific area based on map information, the area identification unit 143 may acquire the information related to the specific area by identifying a target by image processing based on a traveling direction image acquired via the external environment sensor 10 or by recognizing the target based on a contour of the traveling direction image by internal processing of the external environment recognition unit 142.

In addition, as will be described later, a configuration may be adopted in which accuracy of the information related to the specific area acquired by the area identification unit 143 is increased by using VICS information acquired by the communication device 25.

<Action Plan Generation Unit 144>

The action plan generation unit 144 sets a start point of autonomous driving and/or a destination of autonomous driving. The start point of autonomous driving may be a current position of the own vehicle M or may be a point at which an operation of instructing autonomous driving is performed. The action plan generation unit 144 generates an action plan for a section between the start point and the destination of autonomous driving. Note that the action plan generation unit 144 is not limited to this, and may generate an action plan for an arbitrary section.

The action plan includes, for example, a plurality of events to be sequentially executed. The plurality of events include, for example, a deceleration event of decelerating the own vehicle M, an acceleration event of accelerating the own vehicle M, a lane keep event of causing the own vehicle M to travel so as not to deviate from a traveling lane, a lane change event of changing a traveling lane, an overtaking event of causing the own vehicle M to overtake a preceding vehicle, a branching event of causing the own vehicle M to change to a desired lane at a branching point or causing the own vehicle M to travel so as not to deviate from a current traveling lane, a merging event of accelerating and decelerating the own vehicle M in a merging lane for merging with a main lane and changing the traveling lane, and a handover event of causing the own vehicle M to transition from a manual driving mode to an autonomous driving mode (autonomous driving support state) at a starting point of autonomous driving or causing the own vehicle M to transition from the autonomous driving mode to the manual driving mode at a scheduled end point of autonomous driving.

The action plan generation unit 144 sets a lane change event, a branching event, or a merging event for a place where the target lane determined by the target lane determination unit 110 is switched. Information indicating the action plan generated by the action plan generation unit 144 is stored in the storage unit 180 as action plan information 183.

The action plan generation unit 144 includes a mode change unit 145 and a notification control unit 146.

<Mode Change Unit 145>

For example, based on a recognition result of a target existing in the traveling direction of the own vehicle M by the external environment recognition unit 142, the mode change unit 145 selects a driving mode suitable for the recognition result, from driving modes including a plurality of stages of autonomous driving mode and manual driving mode set in advance, and uses the selected driving mode to cause a driving operation of the own vehicle M to be performed.

<Notification Control Unit 146>

When a driving mode of the own vehicle M is transitioned by the mode change unit 145, the notification control unit 146 notifies that the driving mode of the own vehicle M is transitioned. The notification control unit 146 notifies that the driving mode of the own vehicle M is transitioned, for example, by causing the speaker 63 to output sound information stored in advance in the storage 180.

As long as it is possible to notify the driver of the transition of the driving mode of the own vehicle M, the notification is not limited to the notification by sound, and the notification may be performed by display, light emission, vibration, or a combination thereof.

<Trajectory Generation Unit 147>

The trajectory generation unit 147 generates a trajectory along which the own vehicle M should travel based on an action plan generated by the action plan generation unit 144.

<Switching Control Unit 150>

As illustrated in FIG. 2, the switching control unit 150 switches between the autonomous driving mode and the manual driving mode based on a signal input from the autonomous driving changeover switch 71 (see FIG. 3) and other signals. In addition, based on an operation for instructing acceleration, deceleration, or steering with respect to a component of the driving operation system in the HMI 35, the switching control unit 150 switches the autonomous driving mode at that time to a lower-ranking driving mode. For example, when a state in which an operation amount indicated by a signal input from a component of the driving operation system in the HMI 35 exceeds a threshold continues for a reference time or more, the switching control unit 150 switches (overrides) the autonomous driving mode at that time to a lower-ranking driving mode.

In addition, the switching control unit 150 may perform switching control for returning to an original autonomous driving mode in a case where an operation on a component of the driving operation system in the HMI 35 is not detected over a predetermined time after the switching to the lower-ranking driving mode by the override.

<Travel Control Unit 160>

The travel control unit 160 performs travel control of the own vehicle M by controlling the travel driving force output device 200, the steering device 210, and the brake device 220 so that the own vehicle M passes through a trajectory at a scheduled time-point which is generated by the trajectory generation unit 147 and on which the own vehicle M is to travel.

<HMI Control Unit 170>

When setting information related to an autonomous driving mode of the own vehicle M is notified by the driving support control unit 120 the HMI control unit 170 refers to mode-specific operability information 184 indicating, for each driving mode, a device permitted to be used (a part or all of the navigation device 20 and the HMI 35) and a device not permitted to be used, and controls the HMI 35 according to setting content of the autonomous driving mode.

As illustrated in FIG. 2, the HMI control unit 170 determines a device permitted to be used (a part or all of the navigation device 20 and the HMI 35) and a device not permitted to be used, based on driving mode information of the own vehicle M acquired from the driving support control unit 120 and by referring to the mode-specific operability information 184. Based on a determination result, the HMI control unit 170 controls whether to accept a driver operation related to the HMI 35 of the driving operation system or the navigation device 20.

For example, when a driving mode executed by the vehicle control device 100 is the manual driving mode, the HMI control unit 170 accepts a driver operation related to the HMI 35 of the driving operation system (for example, the accelerator pedal 41, the brake pedal 47, the shift lever 51, and the steering wheel 55 in FIG. 3).

The HMI control unit 170 includes a display control unit 171.

<Display Control Unit 171>

The display control unit 171 performs display control related to the internal display device 61 and the external display device 83. Specifically, for example, when a driving mode executed by the vehicle control device 100 is an autonomous driving mode with a high degree of automation, the display control unit 171 performs control to cause the internal display device 61 and/or the external display device 83 to display information such as attention calling, warning, and driving assistance for traffic participants present around the own vehicle M. This will be described in detail later.

<Storage Unit 180>

The storage unit 180 stores information such as the high-precision map information 181, the target lane information 182, the action plan information 183, and the mode-specific operability information 184. The storage unit 180 is implemented with a read only memory (ROM), a random access memory (RAM), a hard disk drive (HDD), a flash memory, or the like. A program to be executed by a processor may be stored in advance in the storage unit 180, or may be downloaded from an external device via an in-vehicle Internet facility or the like. In addition, the program may be installed in the storage unit 180 when a portable storage medium storing the program is mounted on a drive device (not illustrated).

The high-precision map information 181 is map information with higher precision than map information normally provided in the navigation device 20. The high-precision map information 181 includes, for example, information on a center of a lane and information on a boundary of a lane. The boundary of a lane includes a type, a color, a length, a road width, a road shoulder width, a main line width, a lane width, a boundary position, a boundary type (guardrail, planting, curbstone), a zebra zone, and the like of a lane mark, and these boundaries are included in a high-precision map.

The high-precision map information 181 may include road information, traffic regulation information, address information (address and postal code), facility information, telephone number information, and the like. The road information includes information indicating a road type such as an expressway, a toll road, a national highway, and a prefectural road, and information such as the number of lanes of a road, a width of each lane, a gradient of a road, a position of a road (three-dimensional coordinates including longitude, latitude, and height), a curve curvature of a lane, positions of merging and branching points of lanes, and signs provided on a road. The traffic regulation information includes, for example, information indicating that a lane is blocked due to construction, a traffic accident, traffic congestion, or the like.

[Travel Driving Force Output Device 200, Steering Device 210, and Brake Device 220]

As illustrated in FIG. 2, the vehicle control device 100 controls driving of the travel driving force output device 200, the steering device 210, and the brake device 220 in accordance with a travel control command from the travel control unit 160.

<Travel Driving Force Output Device 200>

The travel driving force output device 200 outputs a driving force (torque) for the own vehicle M to travel to driving wheels thereof. For example, when the own vehicle M is an automobile using an internal combustion engine as a power source, the travel driving force output device 200 includes an internal combustion engine, a transmission, and an engine electronic control unit (ECU) that controls the internal combustion engine (none is illustrated).

When the own vehicle M is an electric automobile using an electric motor as a power source, the travel driving force output device 200 includes a drive motor and a motor ECU that controls the drive motor (neither is illustrated).

Further, when the own vehicle M is a hybrid automobile, the travel driving force output device 200 includes an internal combustion engine, a transmission, an engine ECU, a drive motor, and a motor ECU (none is illustrated).

When the travel driving force output device 200 includes only the internal combustion engine, the engine ECU adjusts a throttle opening degree, a shift stage, and the like of the internal combustion engine in accordance with information input from the travel control unit 160 to be described later.

When the travel driving force output device 200 includes only the drive motor, the motor ECU adjusts a duty ratio of a PWM signal provided to the drive motor in accordance with information input from the travel control unit 160.

When the travel driving force output device 200 includes an internal combustion engine and a drive motor, the engine ECU and the motor ECU control a travel driving force in cooperation with each other in accordance with information input from the travel control unit 160.

<Steering Device 210>

The steering device 210 includes, for example, a steering ECU and an electric motor (neither is illustrated). The electric motor, for example, changes a direction of steered wheels by applying a force to a rack and pinion mechanism. The steering ECU drives the electric motor in accordance with information input from the vehicle control device 100 or input information on a steering-wheel steering angle or on a steering torque to change the direction of the steered wheels.

<Brake Device 220>

The brake device 220 is, for example, an electric servo brake device including a brake caliper, a cylinder that transmits a hydraulic pressure to the brake caliper, an electric motor that generates a hydraulic pressure in the cylinder, and a braking control unit (none is illustrated). The braking control unit of the electric servo brake device controls the electric motor according to information input from the travel control unit 160 so that a brake torque corresponding to a braking operation is output to each wheel. The electric servo brake device may include, as a backup, a mechanism that transmits a hydraulic pressure generated by an operation of the brake pedal 47 to the cylinder via a master cylinder.

The brake device 220 is not limited to the electric servo brake device described above, and may be an electronically controlled hydraulic brake device. The electronically controlled hydraulic brake device controls an actuator in accordance with information input from the travel control unit 160 to transmit a hydraulic pressure of a master cylinder to the cylinder. The brake device 220 may include a regenerative brake using a drive motor that may be included in the travel driving force output device 200.

[Block Configuration of Information Presentation Device 300 for Autonomous Vehicle]

Next, a block configuration of an information presentation device 300 for an autonomous vehicle according to the embodiment of the present invention included in the vehicle control device 100 described above will be described with reference to FIG. 6.

Figure 6:
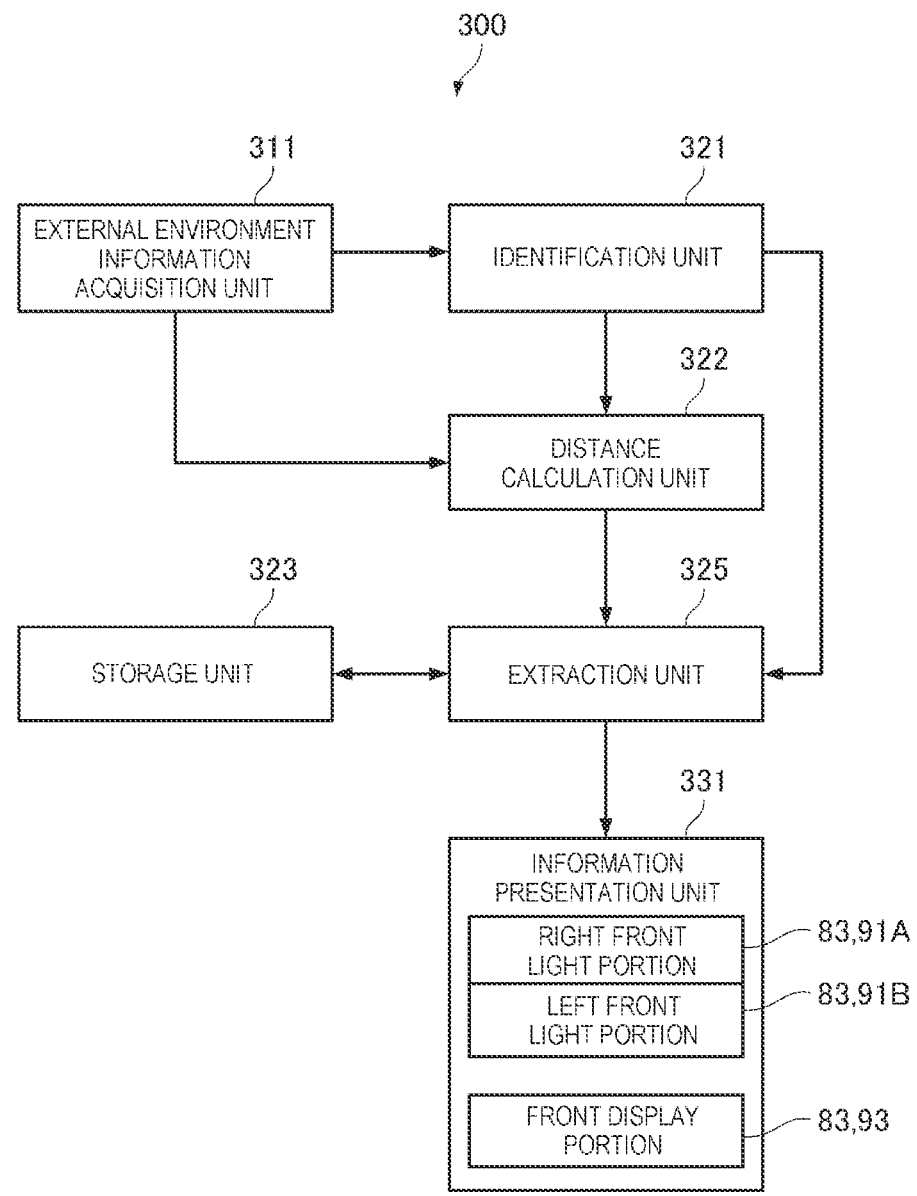
FIG. 6 is a block configuration diagram conceptually illustrating functions of the information presentation device for an autonomous vehicle.

FIG. 6 is a block configuration diagram conceptually illustrating functions of the information presentation device 300 for an autonomous vehicle according to the embodiment of the present invention.

As illustrated in FIG. 6, the information presentation device 300 for an autonomous vehicle includes an external environment information acquisition unit 311, an identification unit 321, a distance calculation unit 322, a storage unit 323, an extraction unit 325, and an information presentation unit 331.

<External Environment Information Acquisition Unit 311>

The external environment information acquisition unit 311 has a function of acquiring external environment information related to a distribution condition of targets that are present in surroundings of the own vehicle M including a front side in the traveling direction and a rear side in the traveling direction of the own vehicle M, which is detected by the external environment sensor 10. An acquisition path for the external environment information of the external environment information acquisition unit 311 is not limited to the external environment sensor 10, and the navigation device 20 and the communication device 25 may be adopted. For example, the external environment information acquisition unit 311 may acquire the above-described user position information from the communication device 25 as one piece of the external environment information.

The external environment information acquisition unit 311 is a functional member corresponding to the recognition unit 140 of the vehicle control device 100 illustrated in FIG. 2.

<Identification Unit 321>

The identification unit 321 has a function of searching for a person present around the own vehicle M based on external environment information acquired by the external environment information acquisition unit 311 and identifying whether a person extracted by the search coincides with a user registered in the own vehicle M. This identification may be implemented, for example, by performing face recognition processing of collating and recognizing face information of a person imaged in the camera 11 with face information of a user registered in a database (not illustrated).

The identification unit 321 is a functional member corresponding to the recognition unit 140 of the vehicle control device 100 illustrated in FIG. 2.

<Distance Calculation Unit 322>

The distance calculation unit 322 has a function of calculating a distance from the own vehicle M to a user of the own vehicle M based on external environment information acquired by the external environment information acquisition unit 311 when the identification unit 321 performs identification indicating that a person extracted coincides with the user. For example, the distance calculation unit 322 calculates the distance from the own vehicle M to the user based on a current position of the own vehicle M and based on a current position of a terminal device of the user indicated by acquired user position information. Accordingly, the distance calculation unit 322 can accurately calculate the distance from the own vehicle M to the user. Therefore, the information presentation unit 331, which will be described later, can perform presentation of information to be presented to the user by using a presentation mode corresponding to the distance to the user that has is highly accurate.

The present invention is not limited to the above example, and the distance calculation unit 322 may, for example, calculate the distance from the omit vehicle M to the user based on an image analysis result of an image imaged by the camera 11, a detection result by the radar 13 or the LIDAR 15, or the like. Further, the communication device 25 may be configured to be able to directly receive radio waves from the terminal device, and the distance calculation unit 322 may calculate the distance to the user (terminal device) based on a reception intensity of the radio waves from the terminal device received by the communication device 25. The distance calculated by the distance calculation unit 322 may be a linear distance from the current position of the own vehicle M to the current position of the user (or the terminal device), or may be a distance along a route from the current position of the own vehicle M to the current position of the user (or the terminal device).

The distance calculation unit 322 is a functional member corresponding to the recognition unit 140 of the vehicle control device 100 illustrated in FIG. 2, <Storage Unit 323>

The storage unit 323 has a function of storing a presentation mode of information (for example, lighting modes of the left and right front light portions 91A and 91B and the front and rear indicators 92 and 98, a display mode of the front display portion 93, and the like, and hereinafter is also referred to as an "information presentation mode") of the information presentation unit 331 that is described later. The information presentation mode stored in the storage unit 323 includes a presentation mode (hereinafter, also referred to as a "user dedicated presentation mode") for performing presentation of information to be presented to a user when the own vehicle M leaves a parking lot of an automated valet parking system.

As will be described in detail later, when the own vehicle M is parked in a parking lot of an automated valet parking system, the own vehicle M automatically moves, in response to an exit request from the user, to a passenger getting-in-and-out area (for example, see a reference sign PL in FIG. 9) where a user can get into the own vehicle M. Then, the user gets into the own vehicle M at the passenger getting-in-and-out area and leaves the parking lot. In such a parking lot of an automated valet parking system, a situation in which a user waits for arrival of the own vehicle M at the passenger getting-in-and-out area may occur. The user dedicated presentation mode stored in the storage unit 323 is mainly assumed to be used in such a situation.

Figure 7:
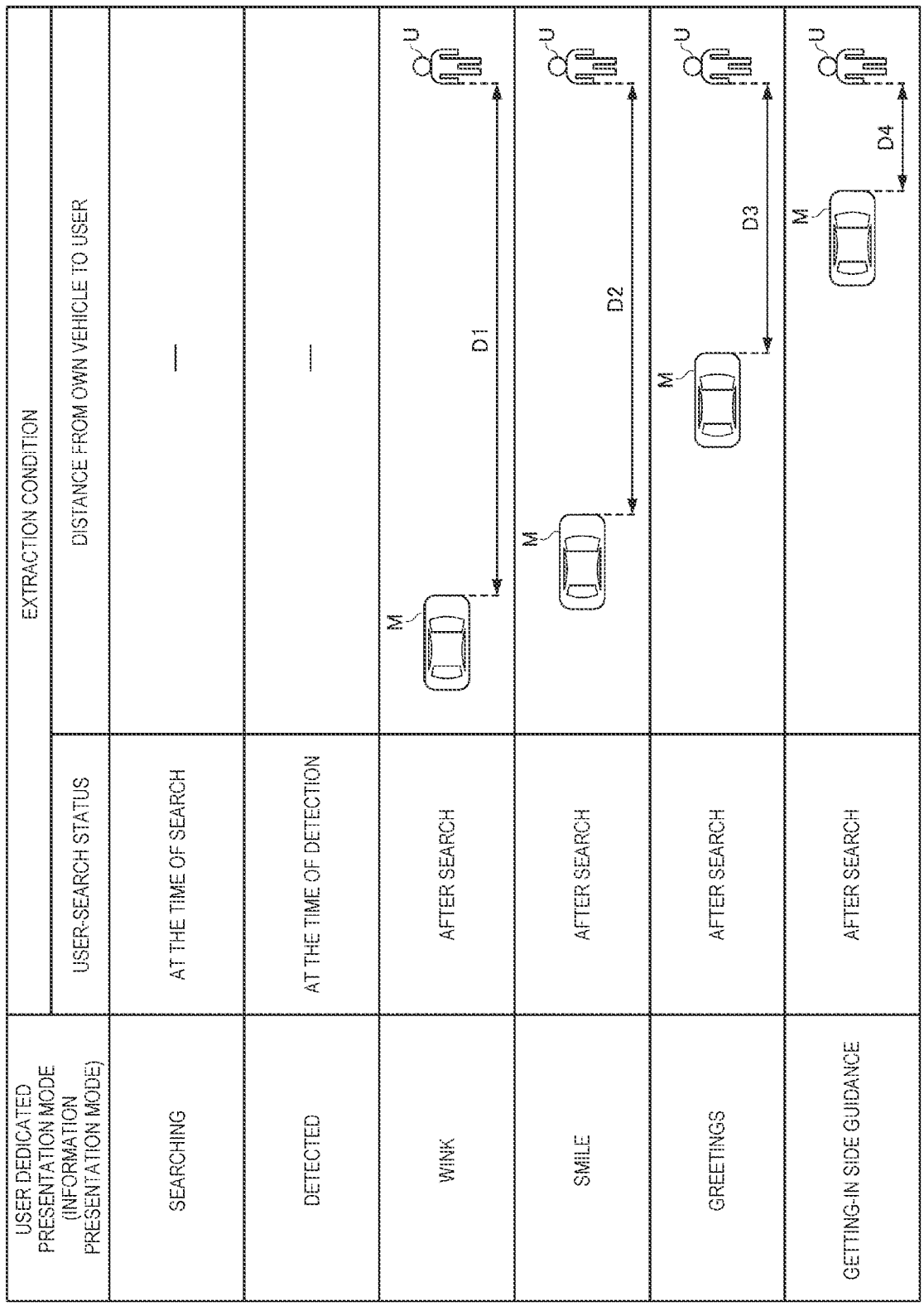
FIG. 7 is a table illustrating an example of a user dedicated presentation mode stored by a storage unit of the information presentation device for an autonomous vehicle.

Here, an example of the user dedicated presentation mode stored in the storage unit 323 will be described with reference to FIG. 7. FIG. 7 is a table illustrating examples of the user dedicated presentation mode stored in the storage unit 323 of the information presentation device 300 for an autonomous vehicle.

As illustrated in FIG. 7, in the present embodiment, a plurality of user dedicated presentation modes such as "searching", "detected", "wink", "smile", "greetings", and "getting-in side guidance" are provided. Each of these user dedicated presentation modes is stored in the storage unit 323 in association with a condition (hereinafter, also referred to as an "extraction condition") under which an extraction unit 325 to be described later extracts the user dedicated presentation mode.

The extraction condition is set using, for example, a distance from the own vehicle M to a user. Accordingly, it is possible to cause the extraction unit 325, which will be described later, to extract a user dedicated presentation mode corresponding to the distance from the own vehicle M to the user, and cause the information presentation unit 331, which will be described later, to perform information presentation using the user dedicated presentation mode Therefore, the information presentation device 300 for an autonomous vehicle can perform presentation of information to be presented to a user by using an appropriate user dedicated presentation mode corresponding to the distance from the own vehicle M to the user, and can present a more natural (more realistic) communication with the user and cause the user to develop a feeling of attachment to the autonomous vehicle.

The extraction condition is also set using a user-search status of the own vehicle M (for example, whether a user is searched for from persons present around the own vehicle M). Accordingly, it is possible to cause the extraction unit 325, which will be described later, to extract a user dedicated presentation mode corresponding to a user-search status of the own vehicle M and cause the information presentation unit 331, which will be described later, to perform information presentation using the user dedicated presentation mode. Therefore, the information presentation device 300 for an autonomous vehicle can perform presentation of information to be presented to a user by using an appropriate user dedicated presentation mode corresponding to the user-search status of the own vehicle M, and can present a more natural (more realistic) communication with the user and cause the user to develop a feeling of attachment to the autonomous vehicle.

Specific examples of information presentation for user dedicated presentation modes of "searching", "detected", "wink", "smile", "greetings", and "getting-in side guidance" will be described later with reference to FIGS. 8A to 8F.

The storage unit 323 is a functional member belonging to the recognition unit 140 of the vehicle control device 100 illustrated in FIG. 2.

<Extraction Unit 325>

The extraction unit 325 has a function of extracting any information presentation mode from the information presentation modes stored in the storage unit 323. For example, the extraction unit 325 extracts any one of a user dedicated presentation mode from the information presentation modes stored in the storage unit 323, based on an identification result of the identification unit 321, a distance from the own vehicle M to a user calculated by the distance calculation unit 322, or the like.

Specifically, for example, when the identification indicating that a person extracted coincides with the user of the own vehicle M is not performed by the identification unit 321 (that is, the user is not yet searched for) and search for the user is being performed, the extraction unit 325 extracts the user dedicated presentation mode of "searching" that corresponds to a user-search status of "at the time of search" in the extraction condition. When the identification indicating that the person extracted coincides with the user of the own vehicle M is performed by the identification unit 321, that is, when the user is searched for (detected), the extraction unit 325 extracts the user dedicated presentation mode of "detected" that corresponds to a user-search status of "at the time of detection" in the extraction condition.

When a distance from the own vehicle M to the user (see a reference sign U in FIG. 7. The same applies to the following description) is a predetermined D1 after the user of the own vehicle M is searched for, the extraction unit 325 extracts a user dedicated presentation mode of "wink" that corresponds to a user-search status of "after search" and a distance to the user being D1 in the extraction condition. Further, when the distance from the own vehicle M to the user is a predetermined D2 (D2<D1) after the user of the own vehicle M is searched for, the extraction unit 325 extracts the user dedicated presentation mode of "smile" that corresponds to a user-search status of "after search" and a distance to the user being D2 in the extraction condition.

Further, when the distance from the own vehicle M to the user is a predetermined D3 (D3<D2) after the user of the own vehicle M is searched for, the extraction unit 325 extracts the user dedicated presentation mode of "greetings" that corresponds to a user-search status of "after search" and a distance to the user being D3 in the extraction condition. Further, when the distance from the own vehicle M to the user is a predetermined D4 (D4<D3) after the user of the own vehicle M is searched for, the extraction unit 325 extracts the user dedicated presentation mode of "getting-in side guidance" that corresponds to a user-search status of "after search" and a distance to the user being D4 in the extraction condition.

The extraction unit 325 is a functional member belonging to the recognition unit 140 in the vehicle control device 100 illustrated in FIG. 2.

<Information Presentation Unit 331>

The information presentation unit 331 has a function of performing presentation of information to be presented to a user of the own vehicle M in a case where identification indicating, as an identification result of the identification unit 321, that a person extracted by search coincides with the user is performed. At this time, the information presentation unit 331 performs presentation of information to be presented to the user, using an information presentation mode extracted by the extraction unit 325.

The information presentation unit 331 is configured to include the right front light portion 91A (see FIGS. 5A and 5C) that is a right eye corresponding portion of the own vehicle M, the left front light portion. 91B (see FIGS. 5A and 5C) that is a left eye corresponding portion of the own vehicle M, and the front display portion 93 (see FIG. 5A).

For example, the right front light portion 91A, the left front light portion 91B, and the front display portion 93 are each configured with an LED panel in which a plurality of light emitting diode (LED) lights are integrated. The information presentation unit 331 performs information presentation by driving these LED panels in accordance with an information presentation mode (for example, a user dedicated presentation mode) extracted by the extraction unit 325.

The information presentation unit 331 is a functional member corresponding to the HMI control unit 170 of the vehicle control device 100 illustrated in FIG. 2.

Here, the specific examples of information presentation for user dedicated presentation modes will be described with reference to FIGS. 8A to 8F.

<User Dedicated Presentation Mode of "Searching">

Figure 8A:
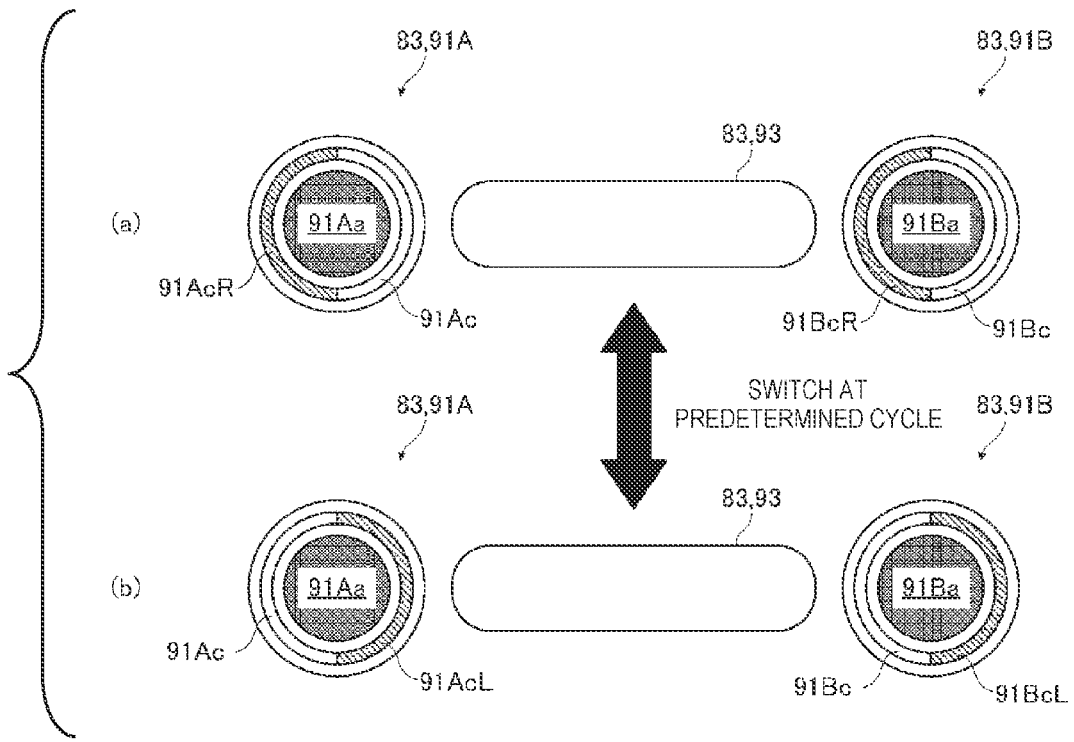
FIG. 8A is a diagram illustrating a specific example of information presentation for a user dedicated presentation mode of "searching".

FIG. 8A is a diagram illustrating a specific example of information presentation for the user dedicated presentation mode of "searching". When an information presentation mode extracted by the extraction unit 325 is the user dedicated presentation mode of "searching", the information presentation unit 331 expresses a restless look using the left and right front light portions 91A and 91B corresponding to the eyes when the own vehicle M is personalized in a front view.

Specifically, as illustrated in FIG. 5A, the left and right front light portions 91A and 91B having circular outer peripheral edges are provided at left and right end portions of the front grille 90 in the vehicle width direction with an interval provided therebetween. Therefore, the left and right front light portions 91A and 91B look just like a pair of eyes when the own vehicle M is personified in a front view.

As illustrated in a part (a) of FIG. 8A, the information presentation unit 331 turns on (the turned-on portion is indicated by oblique lines in FIG. 8A. The same applies in other drawings) a right half portion 91AcR of the annular right light display portion 91Ac of the right front light portion 91A, and turns off a left half portion thereof. Similarly, a right half portion 91BcR of the annular left light display portion 91Bc of the left front light portion 91B is turned on, and a left half portion thereof is turned off. In this way, the left and right front light portions 91A and 91B look just like a pair of eyes looking sideways in a right direction when the own vehicle M is personified in a front view.

As illustrated in a part (b) of FIG. 8A, the information presentation unit 331 turns on a left half portion 91AcL of the annular right light display portion 91Ac of the right front light portion 91A, and turns off the right half portion thereof. Similarly, a left half portion 91BcL of the annular left light display portion 91Bc of the left front light portion 91B is turned on, and the right half portion thereof is turned off. In this way, the left and right front light portions 91A and 91B look just like a pair of eyes looking sideways in a left direction with eyes when the own vehicle M is personified in a front view.

The information presentation unit 331 alternately repeats turning-on of the left and right front light portions 91A and 91B, which is illustrated in the parts (a) and (b) of FIGS. 8A and 8A, at a predetermined cycle. In this way, the left and right front light portions 91A and 91B look just like a pair of eyes looking sideways in the left and right directions restlessly when the own vehicle M is personified in a front view, and can express a restless look.

<User Dedicated Presentation Mode of "Detected">

Figure 8B:
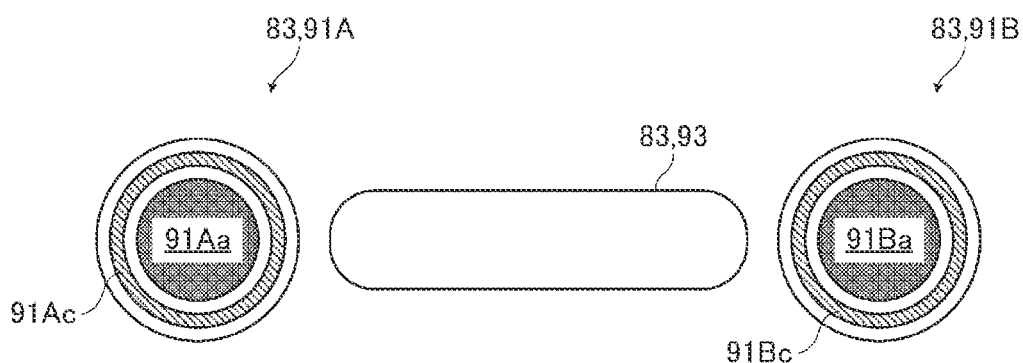
FIG. 8B is a diagram illustrating a specific example of information presentation for a user dedicated presentation mode of "detected".

FIG. 8B is a diagram illustrating a specific example of information presentation for the user dedicated presentation mode of "detected". When an information presentation mode extracted by the extraction unit 325 is the user dedicated presentation mode of "detected", the information presentation unit 331 expresses a stare at the user using the left and right front light portions 91A and 91B corresponding to the eyes when the own vehicle M is personalized in a front view.

Specifically, as illustrated in FIG. 8B, the information presentation unit 331 turns on the entire annular right light display portion 91Ac of the right front light portion 91A. Similarly, the entire annular left light display portion 91Bc of the left front light portion 91B is turned on. In this way, the left and right front light portions 91A and 91B look just like a pair of round eyes staring substantially at the front side when the own vehicle M is personalized in a front view, and can express staring at the user that is present in front of the own vehicle M.

Note that the user dedicated presentation mode of "detected" is not limited to the example in which the entire front light portions 91A and 91B are turned on. For example, in a case where the user is in front of the own vehicle M, the entire front light portions 91A and 91B may be turned on as illustrated in FIG. 8B, in a case where the user is at a right front side of the own vehicle M, only the right half portions 91AcR and 91BcR of the front light portions 91A and 91B may be turned on as illustrated in the part (a) of FIG. 8A, and in a case where the user is at a left front side of the own vehicle M, only the left half portions 91AcL and 91BcL of the front light portions 91A and 91B may be turned on as illustrated in the part (b) of FIG. 8A. In this way, it is possible to express an appropriate stare corresponding to a positional relationship between the own vehicle M and the user.

<User Dedicated Presentation Mode of "Wink">

Figure 8C:
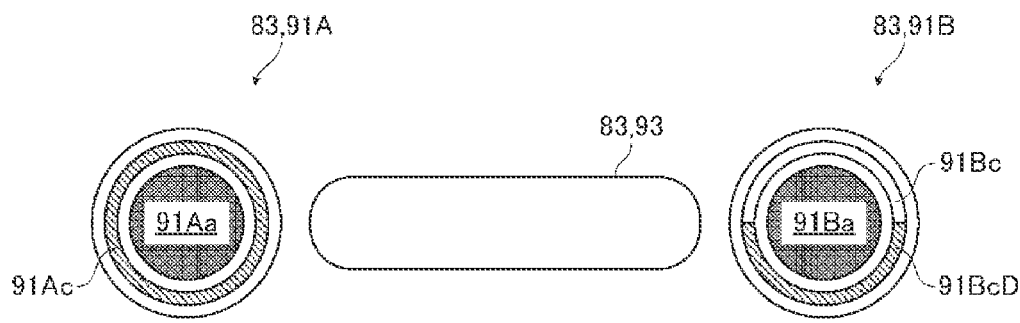
FIG. 8C is a diagram illustrating a specific example of information presentation for a user dedicated presentation mode of "wink".

FIG. 8C is a diagram illustrating a specific example of information presentation for the user dedicated presentation mode of "wink". When an information presentation mode extracted by the extraction unit 325 is the user dedicated presentation mode of "wink", the information presentation unit 331 expresses a wink using the left and right front light portions 91A and 91B corresponding to the eyes when the own vehicle M is personalized in a front view.

Specifically, as illustrated in FIG. 8C, the information presentation unit 331 turns on the entire annular right light display portion 91Ac of the right front light portion 91A. In addition, the information presentation unit 331 turns on a lower half portion 91BcD of the annular left light display portion 91Bc of the left front light portion 91B, and turns off an upper half portion thereof. In this way, the left and right front light portions 91A and 91B look just like a pair of eyes doing a wink, in which the right eye is open and the left eye is closed, when the own vehicle M is personified in a front view.

<User Dedicated Presentation Mode of "Smile">

Figure 8D:
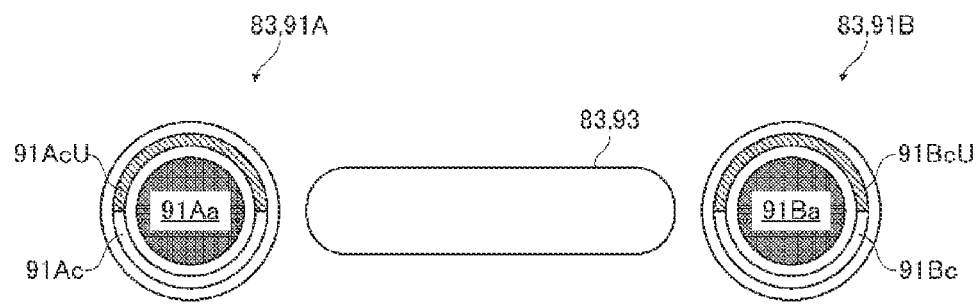
FIG. 8D is a diagram illustrating a specific example of information presentation for a user dedicated presentation mode of "smile".

FIG. 8D is a diagram illustrating a specific example of information presentation for the user dedicated presentation mode of "smile". When an information presentation mode extracted by the extraction unit 325 is the user dedicated presentation mode of "smile", the information presentation unit 331 expresses a smile using the left and right front light portions 91A and 91B corresponding to the eyes when the own vehicle M is personalized in a front view.

Specifically, as illustrated in FIG. 8D, the information presentation unit 331 turns on an upper half portion 91AcU of the annular right light display portion 91Ac of the right front light portion 91A, and turns off a lower half portion thereof. Similarly, an upper half portion 91BcU of the annular left light display portion 91Bc of the left front light portion 91B is turned on, and the lower half portion thereof is turned off. In this way, the left and right front light portions 91A and 91B look just like a pair of eyes narrowed in smiling when the own vehicle M is personified in a front view, and can express a smile.

<User Dedicated Presentation Mode of "Greetings">

Figure 8E:
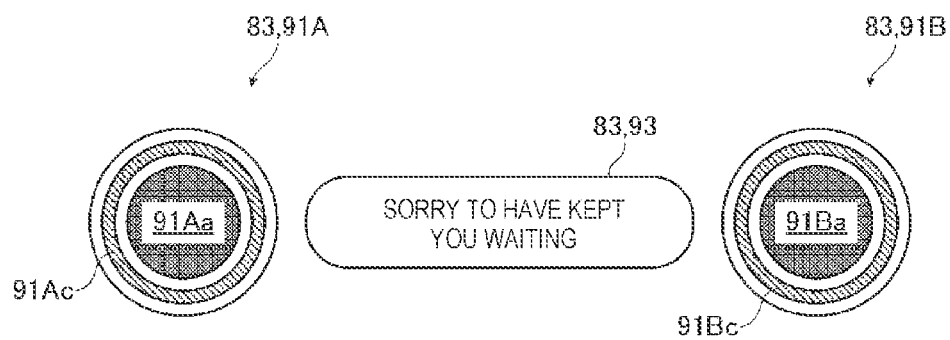
FIG. 8E is a diagram illustrating a specific example of information presentation for a user dedicated presentation mode of "greetings".

FIG. 8E is a diagram illustrating a specific example of information presentation for the user dedicated presentation mode of "greetings". When an information presentation mode extracted by the extraction unit 325 is the user dedicated presentation mode of "greeting", the information presentation unit 331 expresses greetings for the user using the front display portion 93.

Specifically, as illustrated in FIG. 8E, the information presentation unit 331 causes the front display portion 93 to display a message such as "sorry to have kept you waiting". Accordingly, greetings for the user can be expressed. The message or the like to be displayed at this time may be appropriately changed in accordance with time for which the user is made to wait (for example, time the user is cost from issuance of an exit request to the vehicle coming to the user's side or the like. For example, if the time for which the user is made to wait is less than 5 minutes, a message of "sorry to have kept you waiting" may be displayed, and if the time for which the user is made to wait is 5 minutes or more, a message of "terribly sorry to have kept you waiting" may be displayed.

In addition, the message or the like to be displayed at this time may be changed as appropriate according to a time-point at which the vehicle comes to the user's side. For example, when the time-point at which the vehicle comes to the user's side falls between 5:00 to 10:00, a message of "good morning" may be displayed; when the time-point falls between 10:00 to 17:00, a message of "good day" may be displayed; and when the time-point falls between 17:00 to 5:00 on the next day, a message of "good evening" may be displayed.

In addition, when an information presentation mode extracted by the extraction unit 325 is the user dedicated presentation mode of "greetings", the information presentation unit 331 may express a stare at the user using the left and right front light portions 91A and 91B corresponding to the eyes when the own vehicle M is personalized in a front view, similarly to the case of the user dedicated presentation mode of "detected". In the example illustrated in FIG. 8E, the state at the user that is present in front of the own vehicle M is expressed by turning on the entire left and right front light portions 91A and 91B.

<User Dedicated Presentation Mode of "Getting-in Side Guidance">

Figure 8F:
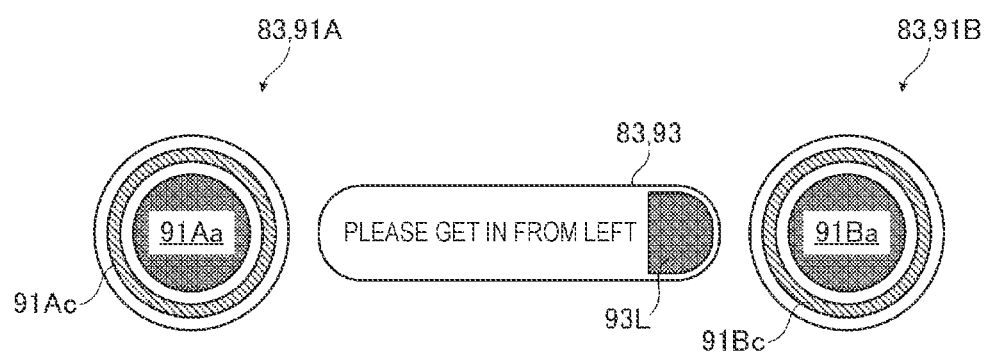
FIG. 8F is a diagram illustrating a specific example of information presentation for a user dedicated presentation mode of "getting-in side guidance".

FIG. 8F is a diagram illustrating a specific example of information presentation for the user dedicated presentation mode of "getting-in side guidance". When an information presentation mode extracted by the extraction unit 325 is the user dedicated presentation mode of "getting-in side guidance", the information presentation unit 331 uses the front display portion 93 to guide a recommended getting-in side for the user to get in the own vehicle M.

For example, it is assumed that the information presentation device 300 for an autonomous vehicle determines to recommend getting in from a left door (for example, a passenger seat side door) of both left and right doors provided in the own vehicle M, based on a positional relationship between the own vehicle M and the user, a traffic condition around the own vehicle M, and the like. In this case, as illustrated in FIG. 8F, the information presentation unit 331 causes the front display portion 93 to display a message of "please get in from left". In addition, for example, the information presentation unit 331 may turn on a left end portion 93L of the front display portion 93. In this way, the user can be more intuitively guided to a recommended getting-in side when getting in the own vehicle M.

[Operations of Autonomous Vehicle M]

Figure 9:
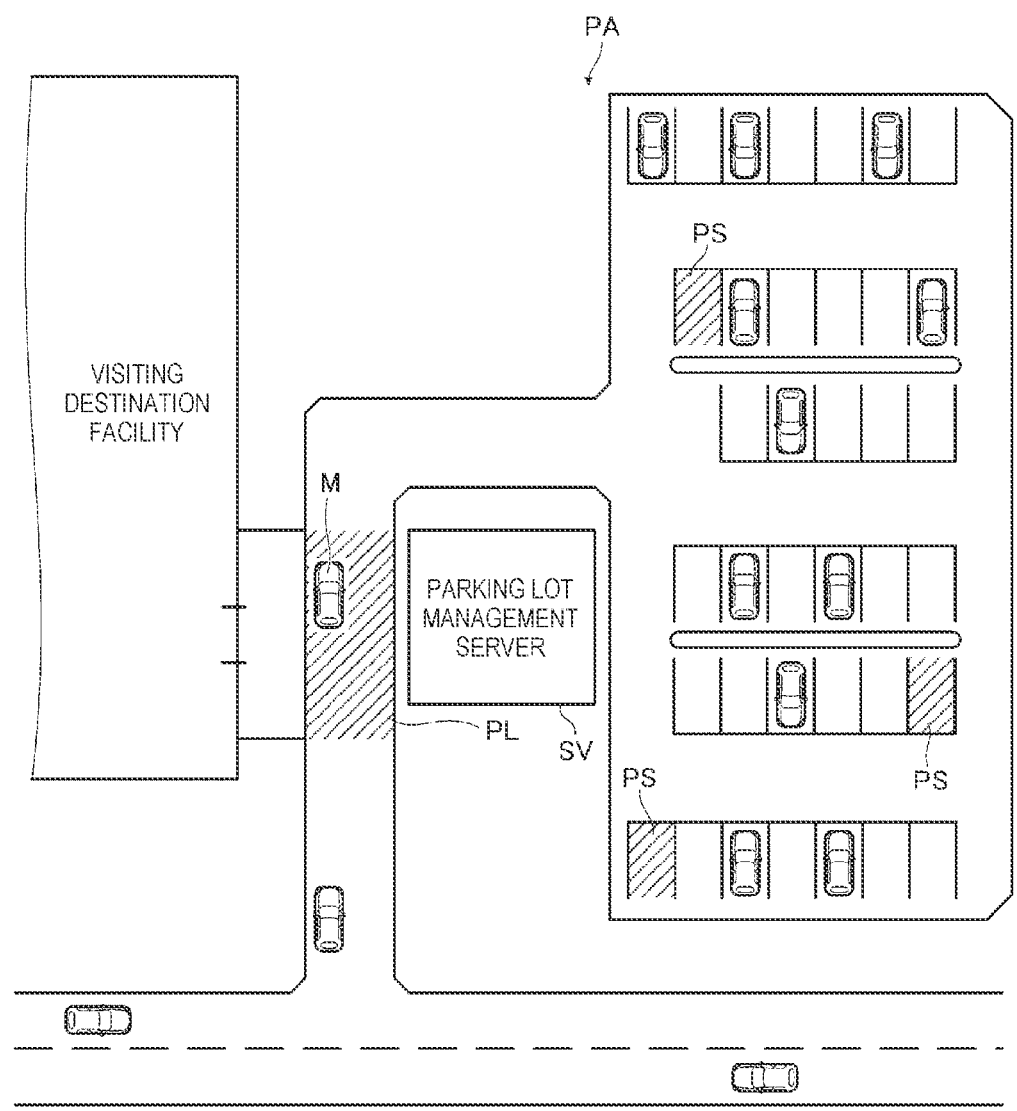
FIG. 9 is a diagram illustrating an example of a parking lot of an automated valet parking system in which an autonomous vehicle can be parked.

Next, an example of operations of the autonomous vehicle M will be described. As described above, the autonomous vehicle M can be parked in a parking lot of an automated valet parking system. Here, an example of a parking lot of the automated valet parking system will be described with reference to FIG. 9. FIG. 9 is a diagram illustrating an example of a parking lot of the automated valet parking system.

As illustrated in FIG. 9, a parking lot PA serving as an example of a parking lot of the automated valet parking system is provided together with a visiting destination facility (for example, a hotel or a department store) that is a visiting destination of a user, and includes a plurality of parking spaces PS where a vehicle such as the autonomous vehicle M can be parked, and the passenger getting-in-and-out area PL where the user of the vehicle parked in the parking lot PA can get in and out of the vehicle. Hereinafter, an example in which the user of the autonomous vehicle M uses the parking lot PA will be described.

Prior to parking the own vehicle M in the parking lot PA, the user uses a terminal device or the like to make a reservation for using the parking lot PA (hereinafter, also referred to as a "parking reservation") with respect to a parking lot management server SV that manages the parking lot PA. Through the parking reservation, the user registers use date and time of using the parking lot PA (that is, date and time of parking the own vehicle M the parking lot PA), a vehicle ID that is an identifier of the own vehicle M (for example, numbers on a number plate of the own vehicle M), and the like into the parking lot management server SV.

Thereafter, when the use date and time registered in the parking lot management server SV through the parking reservation comes, the user drives the own vehicle M to the passenger getting-in-and-out area PL and gets out of the own vehicle M at the passenger getting-in-and-out area PL. After the user gets out of the vehicle, the own vehicle M starts an autonomous entry event in which the own vehicle M moves to a predetermined parking space PS in the parking lot PA by autonomous driving. For example, when the user transmits an entry request to the parking lot management server SV by using a terminal device or the like, and the parking lot management server SV that receives the entry request transmits an entry instruction indicating a parking space PS that is a movement destination to the own vehicle M, the autonomous entry event is started. The own vehicle M that starts the autonomous entry event moves to the parking space PS designated by the parking lot management server SV by autonomous driving while performing sensing or the like by the external environment sensor 10.

In addition, the own vehicle M parked in the parking lot PA starts an autonomous exit event of moving to the passenger getting-in-and-out area PL in response to an exit request from the user. For example, when the user transmits an exit request to the parking lot management server SV by using a terminal device or the like, and the parking lot management server SV that receives the exit request transmits an exit instruction to the own vehicle M for instructing the own vehicle M to move to the passenger getting-in-and-out area PL, the autonomous exit event is started. The own vehicle M that starts the autonomous exit event moves to the passenger getting-in-and-out area PL by autonomous driving while performing sensing or the like by the external environment sensor 10. Then, the own vehicle M searches for the user when arriving at the passenger getting-in-and-out area PL, and moves to the user's side when the user is searched (detected). The user gets into the own vehicle M at the passenger getting-in-and-out area PL and leaves the parking lot PA.

Hereinafter, an example of operations of the autonomous vehicle M at the time of exiting a parking lot PA of the automated valet parking system will be described with reference to FIG. 10.

Figure 10:
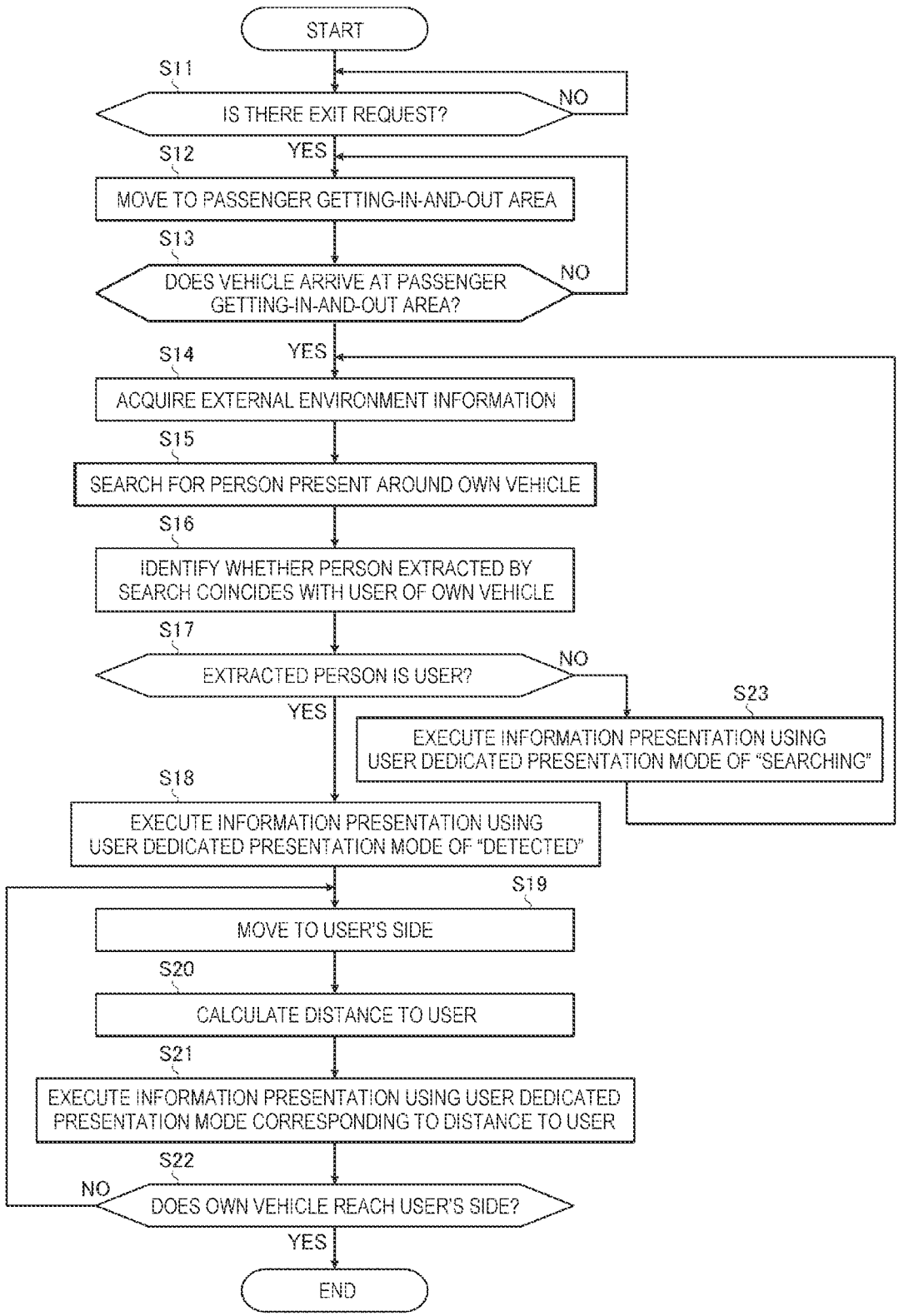
FIG. 10 is a flowchart illustrating operations of the vehicle control device of the autonomous vehicle.

FIG. 10 is a flowchart illustrating operations of the vehicle control device 100 of the autonomous vehicle M at the time of exiting the parking lot PA of the automated valet parking system.

In step S11 illustrated in FIG. 10, the vehicle control device 100 of the autonomous vehicle M parked in the parking lot PA of the automated valet parking system determines whether there is an exit request from the user. For example, when there is an exit instruction for instructing the own vehicle M to move to the passenger getting-in-and-out area PL that is sent from the parking lot management server SV to the own vehicle M, the vehicle control device 100 determines it to be YES in step S11, and causes the flow of processing to proceed to a next step S12.

On the other hand, when there is no exit instruction from the parking lot management server SV to the own vehicle M, the vehicle control device 100 determines it to be NO in step S11 and repeats the processing of step S11 until there is an exit instruction from the parking lot management server SV.

In step S12, the vehicle control device 100 moves the own vehicle M toward the passenger getting-in-and-out area PL while performing sensing or the like by the external environment sensor 10.

In step S13, the vehicle control device 100 determines whether the own vehicle M arrives at the passenger getting-in-and-out area PL. When it is determined, as a result of the determination in step S13, that the own vehicle M arrives at the passenger getting-in-and-out area PL, the vehicle control device 100 causes the flow of processing to proceed to a next step S14.

On the other hand, when it is determined, as a result of the determination in step S13, that the own vehicle M does not arrive at the passenger getting-in-and-out area PL, the vehicle control device 100 repeats the processing of step S12 and step S13 until it is determined that the own vehicle M arrives at the passenger getting-in-and-out area PL.

In step S14, the external environment information acquisition unit 311 acquires external environment information related to a distribution condition of targets that are present in surroundings of the own vehicle M including the front side in the traveling direction and the rear side in the traveling direction of the own vehicle M, which is detected by the external environment sensor 10.

In step S15, the identification unit 321 searches for a person present around the own vehicle M based on the external environment information acquired by the external environment information acquisition unit 311.

In step S16, the identification unit 321 identities whether a person extracted by the search in step S15 coincides with a user registered in the own vehicle M.

In step S17, when it is identified, as a result of the identification in step S16, that the person extracted by the search in step S15 coincides with the user registered in the own vehicle M, the vehicle control device 100 causes the flow of processing to proceed to a next step S18.

On the other hand, when it is identified, as a result of the identification in step S16, that the person extracted by the search in step S15 does not coincide with the user registered in the own vehicle M, the vehicle control device 100 causes the flow of processing to proceed to step S23.

In step S18, the information presentation device 300 for an autonomous vehicle performs information presentation using the user dedicated presentation mode of "detected". Specifically, the extraction unit 325 extracts the user dedicated presentation mode of "detected", and the information presentation unit 331 performs the information presentation (see FIG. 8B) using the user dedicated presentation mode of "detected".

In step S19, the vehicle control device 100 causes the own vehicle M to move to the user's side while performing sensing or the like by the external environment sensor 10.

In step S20, the distance calculation unit 322 calculates a distance from the own vehicle M to the user.

In step S21, the information presentation device 300 for an autonomous vehicle performs information presentation using a user dedicated presentation mode corresponding to the distance to the user calculated by the distance calculation unit 322. Specifically, from among the user dedicated presentation modes illustrated in FIG. 7, the extraction unit 325 extracts a user dedicated presentation mode that corresponds to both a user-search status of "after search" and the distance calculated in the latest step S20, and the information presentation unit 331 performs the information presentation (see FIG. 8C to FIG. 8F) using the extracted user dedicated presentation mode.

In step S22, the vehicle control device 100 determines whether the own vehicle M reaches the user's side. When it is determined, as a result of the determination in step S22, that the own vehicle M does not reach the user's side, the vehicle control device 100 repeats the processing of step S19 to step S22 until it is determined that the own vehicle M reaches the user's side.

In step S23, the information presentation device 300 for an autonomous vehicle performs information presentation using the user dedicated presentation mode of "searching". Specifically, the extraction unit 325 extracts the user dedicated presentation mode of "searching", and the information presentation unit 331 performs the information presentation (see FIG. 8A) using the user dedicated presentation mode of "searching".

As described above, according to the information presentation device 300 for an autonomous vehicle, when identification indicating, as an identification result of the identification unit 321, that the person extracted by the search coincides with the user is performed, the information presentation unit 331 performs presentation of information to be presented to the user, and changes a presentation mode of information to be presented to the user according to the distance from the own vehicle M to the user. Accordingly, the information presentation device 300 for an autonomous vehicle can perform presentation of information to be presented to the user by using an appropriate user dedicated presentation mode corresponding to a distance from the own vehicle M to the user, and can present a more natural (more realistic) communication with the user and cause the user to develop a feeling of attachment to the autonomous vehicle.

In addition, for example, a large number of vehicles may gather at the passenger getting-in-and-out area PL of the parking lot PA of the automated valet parking system. In such a case, when the user of the autonomous vehicle M calls the autonomous vehicle M to the passenger getting-in-and-out area PL, it is difficult for the user of the autonomous vehicle M to immediately determine which vehicle in the passenger getting-in-and-out area PL is the autonomous vehicle M (that is, the user's own vehicle). In particular, when another vehicle of the same type as the autonomous vehicle M or having a shape similar to that of the autonomous vehicle M is in the passenger getting-in-and-out area PL, it is more difficult for the user to perform the above determination.

However, the information presentation device 300 for an autonomous vehicle can change the presentation mode of information to be presented to the user according to the distance from the own vehicle M to the user, thereby giving a hint to the user by which the user can intuitively and easily know which vehicle is the autonomous vehicle M based on the presentation mode. In other words, by doing so, it is possible to make a presentation in which the autonomous vehicle M is heading to the user who is waiting for the autonomous vehicle M in the passenger getting-in-and-out area PL while changing expressions thereof, as if people are waiting for each other. Accordingly, it is possible to give a hint to the user by which the user can easily know which vehicle is the autonomous vehicle M based on the presentation mode of information of the autonomous vehicle M, thereby supporting the user in the above determination. Therefore, it is possible to improve the convenience for the user.

The present invention is not limited to the embodiment described above, and modifications, improvements, or the like can be made as appropriate.

For example, in exiting the parking lot PA, a case where the user arrives at the passenger getting-in-and-out area PL earlier than the own vehicle M and a case where the own vehicle M arrives at the passenger getting-in-and-out area PL earlier than the user may be considered. Therefore, the information presentation unit 331 may cause the presentation mode of information to be presented to the user to be different between the case where the user arrives at the passenger getting-in-and-out area PL earlier than the own vehicle M and the case where the own vehicle M arrives at the passenger getting-in-and-out area PL earlier than the user. Specifically, for example, in the case where the user arrives at the passenger getting-in-and-out area PL earlier than the own vehicle M, the information presentation unit 331 causes the front display portion 93 to display "sorry to have kept you waiting" when performing information presentation using the user dedicated presentation mode of "greetings". On the other hand, in the case where the own vehicle M arrives at the passenger getting-in-and-out area PL earlier than the user, the information presentation unit 331 causes the front display portion 93 to display "been waiting for you" when performing the information presentation using the user dedicated presentation mode of "greetings". In this way, it is possible to present a more natural (more realistic) communication with the user, and it is possible to further cause the user to develop a feeling of attachment to the autonomous vehicle M.

Although an example in which user dedicated information presentation is executed by using the left and right front light portions 91A and 91B and the front display portion 93 has been described in the above-described embodiment, the present invention is not limited thereto. For example, the user may appear behind the own vehicle M. Therefore, the information presentation unit 331 may switch the external display device 83 used in the case of performing presentation of information to be presented to the user, according to a positional relationship between the own vehicle M and the user. Specifically, when the user is positioned in front of the own vehicle M, the information presentation unit 331 performs presentation of information to be presented to the user by using the left and right front light portions 91A and 91B, the front display portion 93, the front indicator 92, and the like. On the other hand, when the user is positioned behind the own vehicle M, the information presentation unit 331 performs presentation of information to be presented to the user by using the left and right rear light portions 95A and 95B, the rear display portion 97, the rear indicator 98, and the like. In this way, it is possible to perform presentation of information to be presented to the user by using the appropriate external display device 83 corresponding to the positional relationship between the own vehicle M and the user, and thus it is possible to achieve communication with the user.

When the user gets out of the own vehicle M, the information presentation unit 331 may further perform presentation of information corresponding to a schedule of the user with the user as a presentation target. For example, when the user gets out of the own vehicle M at the passenger getting-in-and-out area PL, the information presentation unit 331 may display a message such as "come to pick U up at T" on the front display 93. Here, "T" is, for example, a scheduled time-point at which the own vehicle M exits the parking lot PA, and is a time-point registered by the user at the time of making a reservation for using the parking lot PA. In this way, it is possible to present, to the user, appropriate information corresponding to the schedule of the user, and it is possible to improve the convenience for the user. The presentation of information corresponding to the schedule of the user is not limited to the example described above. For example, when the user will use the own vehicle M again after getting out of the vehicle, a message such as "see you later" may be displayed on the front display portion 93, or when it takes a predetermined time or more until the user uses the own vehicle M again, a message such as "bye, see you next time" may be displayed on the front display portion 93. The schedule of the user can be acquired from the terminal device of the user, the parking lot management server SV, or the like via the communication device 25.

The information presentation unit 331 may consider not only a distance from the own vehicle M to the user but also a vehicle speed of the own vehicle M when presenting information with the user as a presentation target. For example, when the distance from the own vehicle M to the user is equal to or less than a predetermined distance and the vehicle speed of the own vehicle M is equal to or less than a predetermined speed, the information presentation unit 331 may start presentation of information to be presented to the user.

Although it is described in the embodiment described above that identification by the identification unit 321 can be implemented by performing face recognition processing of collating and recognizing face information of a person imaged by the camera 11 with face information of a user registered in a database, the present invention is not limited thereto. The identification by the identification unit 321 may be implemented, for example, by performing user identification processing with a smart key possessed by the user.

The present invention can also be implemented in a form in which a program for implementing one or more functions according to the above-described embodiment is supplied to a system or a device via a network or a storage medium, and one or more processors in a computer of the system or the device read and execute the program. Alternatively, the present invention may be implemented by a hardware circuit (for example, an ASIC) that implements one or more functions. Information including a program for implementing each function can be held in a recording device such as a memory or a hard disk, or a recording medium such as a memory card or an optical disk.

The above-described embodiment is described for the case where the own vehicle M has a right-hand drive specification and the road is of left hand drive, but the present invention is also applicable to the case where the own vehicle M has a left hand drive specification and the road is of right hand drive. At least the following matters are described in the present description. Components and the like corresponding to the above-described embodiment are shown in parentheses, but the present invention is not limited thereto.

(1) An information presentation device for an autonomous vehicle (information presentation device 300 for an autonomous vehicle) that is used for an autonomous vehicle (autonomous vehicle M) and presents information to a person present around an own vehicle, in which the autonomous vehicle acquires external environment information including a target present around the own vehicle, generates an action plan of the own vehicle based on the acquired external environment information, and automatically moves according to the generated action plan, and the autonomous vehicle automatically moves, in response to a request from a user of the own vehicle, to a predetermined position (passenger vetting-in-and-out area PL) where the user is able to get into the own vehicle, the information presentation device for an autonomous vehicle including:
- an identification unit (identification unit 321) that searches for a person present around the own vehicle based on the external environment information at the predetermined position and identifies whether a person extracted by the search coincides with the user; and
- an information presentation unit (information presentation unit 331) that performs presentation of information dedicated to a person present around the own vehicle by using an external display device (external display device 83) provided in the own vehicle,
- in which when identification indicating, as an identification result of the identification unit, that the person extracted by the search coincides with the user is performed, the information presentation unit performs presentation of information to be presented to the user, and changes a presentation mode of information to be presented to the user according to a distance from the own vehicle to the user.

According to (1), when the identification indicating, as an identification result of the identification unit, that the person extracted by the search coincides with the user of the own vehicle is performed, the information presentation unit performs presentation of information to be presented to the user, and changes the presentation mode of information to be presented to the user according to the distance from the own vehicle M to the user. Accordingly, it is possible to perform presentation of information to be presented to the user by using an appropriate presentation mode corresponding to the distance from the own vehicle to the user, and it is possible to present a more natural (more realistic) communication with the user and cause the user to develop a feeling of attachment to the autonomous vehicle.

(2) The information presentation device for an autonomous vehicle according to (1),
- in which the autonomous vehicle is a vehicle capable of automatically entering and exiting a parking lot (parking lot PA) of an automated valet parking system, and when being parked in the parking lot, the autonomous vehicle automatically moves, in response to an exit request from the user, to the predetermined position in the parking lot where the user is able to get into the own vehicle.

According to (2), when the autonomous vehicle is called to a predetermined position in the parking lot of the automated valet parking system where the user is able to get into the vehicle, it is possible to give the user a hint by which the user easily knows which vehicle at the predetermined position is the autonomous vehicle (that is, the own vehicle), and it is possible to improve convenience for the user.

(3) The information presentation device for an autonomous vehicle according to (1) or (2), further including:
- a distance calculation unit (distance calculation unit 322) that calculates the distance based on a current position of the own vehicle and a current position of a terminal device of the user,
- in which the information presentation unit changes the presentation mode of information to be presented to the user according to the distance calculated by the distance calculation unit.

According to (3), the distance calculation unit is further provided that calculates the distance based on the current position of the own vehicle and the current position of the terminal device of the user, and the information presentation unit changes the presentation mode of information to be presented to the user according to the distance calculated by the distance calculation unit. Accordingly, it is possible to perform presentation of information to be presented to the user by using a presentation mode corresponding to the distance to the user that is calculated by the distance calculation unit and that is highly accurate.

(4) The information presentation device for an autonomous vehicle according to any one of (1) to (3),
- in which the information presentation unit causes the presentation mode of information to be presented to the user to be different between a case where the user arrives at the predetermined position earlier than the own vehicle and a case where the own vehicle arrives at the predetermined position earlier than the user.

According to (4), since the presentation mode of information to be presented to the user is made different between the case where the user arrives at the predetermined position earlier than the own vehicle and the case where the own vehicle arrives at the predetermined position earlier than the user, it is possible to present a more natural (more realistic) communication with the user, and to cause the user to develop a feeling of attachment to the autonomous vehicle.

(5) The information presentation device for an autonomous vehicle according to any one of (1) to (4),
- in which the external display device is provided at a front portion and a rear portion of the own vehicle, and
- in which the information presentation unit switches, in accordance with a positional relationship between the own vehicle and the user, an external display device used in a case where presentation of information to be presented to the user is performed.

According to (5), since the external display device is provided at the front portion and the rear portion of the own vehicle, and the information presentation unit switches, in accordance with the positional relationship between the own vehicle and the user, the external display device used in the case where presentation of information to be presented to the user is performed, it is possible to perform presentation of information unique to the owner by using an appropriate external display device corresponding to the positional relationship between the own vehicle and the user.

(6) The information presentation device for an autonomous vehicle according to any one of (1) to (5),
- in which the information presentation unit further performs presentation of information corresponding to a schedule of the user with the user as a presentation target when the user gets out of the own vehicle.

According to (6), when the user gets out of the own vehicle, the information corresponding to the schedule of the user is further presented to the user serving as a presentation target. Therefore, appropriate information corresponding to the schedule of the user can be presented to the user, and convenience for the user can be improved.

What is claimed is:

1. An information presentation device for an autonomous vehicle that is used for an autonomous vehicle and presents information to a person present around an own vehicle, in which the autonomous vehicle acquires external environment information including a target present around the own vehicle, generates an action plan of the own vehicle based on the acquired external environment information, and automatically moves according to the generated action plan, and the autonomous vehicle automatically moves, in response to a request from a user of the own vehicle, to a predetermined position where the user is able to get into the own vehicle, the information presentation device for an autonomous vehicle comprising:

an identification unit configured to search for a person present around the own vehicle based on the external environment information at the predetermined position and identify whether a person extracted by the search coincides with the user; and an information presentation unit configured to perform presentation of information dedicated to a person present around the own vehicle by using an external display device provided in the own vehicle, wherein when identification indicating, as an identification result of the identification unit, that the person extracted by the search coincides with the user is performed, the information presentation unit is further configured to perform presentation of information to be presented to the user, and change a presentation mode of information to be presented to the user according to a distance from the own vehicle to the user, and wherein the identification unit and the information presentation unit are each implemented via at least one processor.

2. The information presentation device for an autonomous vehicle according to claim 1, wherein the information presentation device is for the autonomous vehicle capable of automatically entering and exiting a parking lot of an automated valet parking system, and the information presentation unit is further configured to perform the presentation when the autonomous vehicle is parked in the parking lot, and automatically moves, in response to an exit request from the user, to the predetermined position in the parking lot where the user is able to get into the own vehicle.

3. The information presentation device for an autonomous vehicle according to claim 1, further comprising:

a distance calculation unit configured to calculate the distance based on a current position of the own vehicle and a current position of a terminal device of the user, wherein the information presentation unit is further configured to change the presentation mode of information to be presented to the user according to the distance calculated by the distance calculation unit, and wherein the distance calculation unit is implemented via at least one processor.

4. The information presentation device for an autonomous vehicle according to claim 1, wherein the information presentation unit is further configured to cause the presentation mode of information to be presented to the user to be different between a case where the user arrives at the predetermined position earlier than the own vehicle and a case where the own vehicle arrives at the predetermined position earlier than the user.

5. The information presentation device for an autonomous vehicle according to claim 1, wherein the external display device is provided at a front portion and a rear portion of the own vehicle, and wherein the information presentation unit is further configured to switch, in accordance with a positional relationship between the own vehicle and the user, an external display device used in a case where presentation of information to be presented to the user is performed.

6. The information presentation device for an autonomous vehicle according to claim 1, wherein the information presentation unit is further configured to perform presentation of information corresponding to a schedule of the user with the user as a presentation target when the user gets out of the own vehicle.

* * * * *